US012487120B2

(12) United States Patent
Siess et al.

(10) Patent No.: US 12,487,120 B2
(45) Date of Patent: Dec. 2, 2025

(54) SECTIONAL MULTI SPECTRAL SENSOR WITH OPTICAL BLURRING

(71) Applicant: ams Sensors Germany Gmbh, Jena (DE)

(72) Inventors: Gunter Siess, Eindhoven (NL); Chen Li, Eindhoven (NL); Alessandro Piotto, Eindhoven (NL)

(73) Assignee: ams Sensors Germany GmbH, Jena (DE)

( * ) Notice: Subject to any disclaimer, the term of this patent is extended or adjusted under 35 U.S.C. 154(b) by 136 days.

(21) Appl. No.: 18/291,882

(22) PCT Filed: Jul. 22, 2022

(86) PCT No.: PCT/EP2022/070711
§ 371 (c)(1),
(2) Date: Jan. 24, 2024

(87) PCT Pub. No.: WO2023/006631
PCT Pub. Date: Feb. 2, 2023

(65) Prior Publication Data
US 2025/0085160 A1    Mar. 13, 2025

(30) Foreign Application Priority Data
Jul. 29, 2021    (GB) .................................... 2110931

(51) Int. Cl.
*G01J 1/42*    (2006.01)
*G01J 1/02*    (2006.01)
(Continued)

(52) U.S. Cl.
CPC .......... *G01J 1/4204* (2013.01); *G01J 1/0233* (2013.01); *G01J 1/029* (2013.01); *G01J 1/0411* (2013.01);
(Continued)

(58) Field of Classification Search
CPC ................... G01J 1/4204; G01J 1/4228; G01J 2001/4247; G01J 1/029; G01J 1/0411;
(Continued)

(56) References Cited

U.S. PATENT DOCUMENTS

| 10,345,151 B1 | 7/2019 | Sarkar et al. |
| 2005/0218303 A1 | 10/2005 | Poplin |

(Continued)

FOREIGN PATENT DOCUMENTS

| EP | 2472853 A1 | 7/2012 |
| WO | 2013064511 A1 | 5/2013 |
| WO | 2014143338 A2 | 9/2014 |

OTHER PUBLICATIONS

International Search Report and Written Opinion in PCT/EP2022/070711, mailed Nov. 23, 2022, 16 pages.

(Continued)

*Primary Examiner* — Kevin K Pyo
(74) *Attorney, Agent, or Firm* — Viering, Jentschura & Partner mbB

(57) ABSTRACT

In a first aspect of the disclosure there is provided a multi-spectral optical sensor comprising: a monolithic semiconductor chip defining a plurality of subarrays of optical detector regions, each array comprising the same number and relative spatial arrangement of optical detector regions; a plurality of optical filters; and a plurality of lens elements, wherein each optical filter is positioned between a corresponding lens element and a corresponding subarray of optical detector regions such that light from a scene incident on any one of the lens elements along a direction of incidence propagates through the corresponding optical filter towards a corresponding one of the optical detector regions of the corresponding subarray of optical detector regions, which corresponding one of the optical detector regions depending on the direction of incidence, and (Continued)

wherein the incident light forms an out-of-focus image of the scene at a plane of the optical detector regions.

17 Claims, 19 Drawing Sheets

(51) Int. Cl.
  *G01J 1/04* (2006.01)
  *G01J 3/02* (2006.01)
  *G01J 3/28* (2006.01)
(52) U.S. Cl.
  CPC ........... *G01J 1/0466* (2013.01); *G01J 1/0474* (2013.01); *G01J 1/0492* (2013.01); *G01J 1/4228* (2013.01); *G01J 3/0208* (2013.01); *G01J 3/0248* (2013.01); *G01J 3/2803* (2013.01); *G01J 3/2823* (2013.01); *G01J 2001/4247* (2013.01); *G01J 2003/2806* (2013.01); *G01J 2003/2826* (2013.01)
(58) Field of Classification Search
  CPC ...... G01J 1/0474; G01J 1/0429; G01J 3/0208; G01J 3/2803; G01J 2003/2806; G01J 2003/2826

See application file for complete search history.

(56) References Cited

U.S. PATENT DOCUMENTS

| | | |
|---|---|---|
| 2016/0165202 A1 | 6/2016 | Lee |
| 2016/0187195 A1 | 6/2016 | Jung et al. |
| 2016/0232828 A1 | 8/2016 | Jia et al. |
| 2019/0080668 A1 | 3/2019 | Holenarsipur et al. |
| 2020/0116559 A1 | 4/2020 | Pacala et al. |
| 2025/0067596 A1* | 2/2025 | Siess ..................... G01J 1/0437 |

OTHER PUBLICATIONS

UK office action issued for the corresponding UK patent application No. 2110931.9, dated Jan. 11, 2022, 3 pages (for informational purposes only).

* cited by examiner

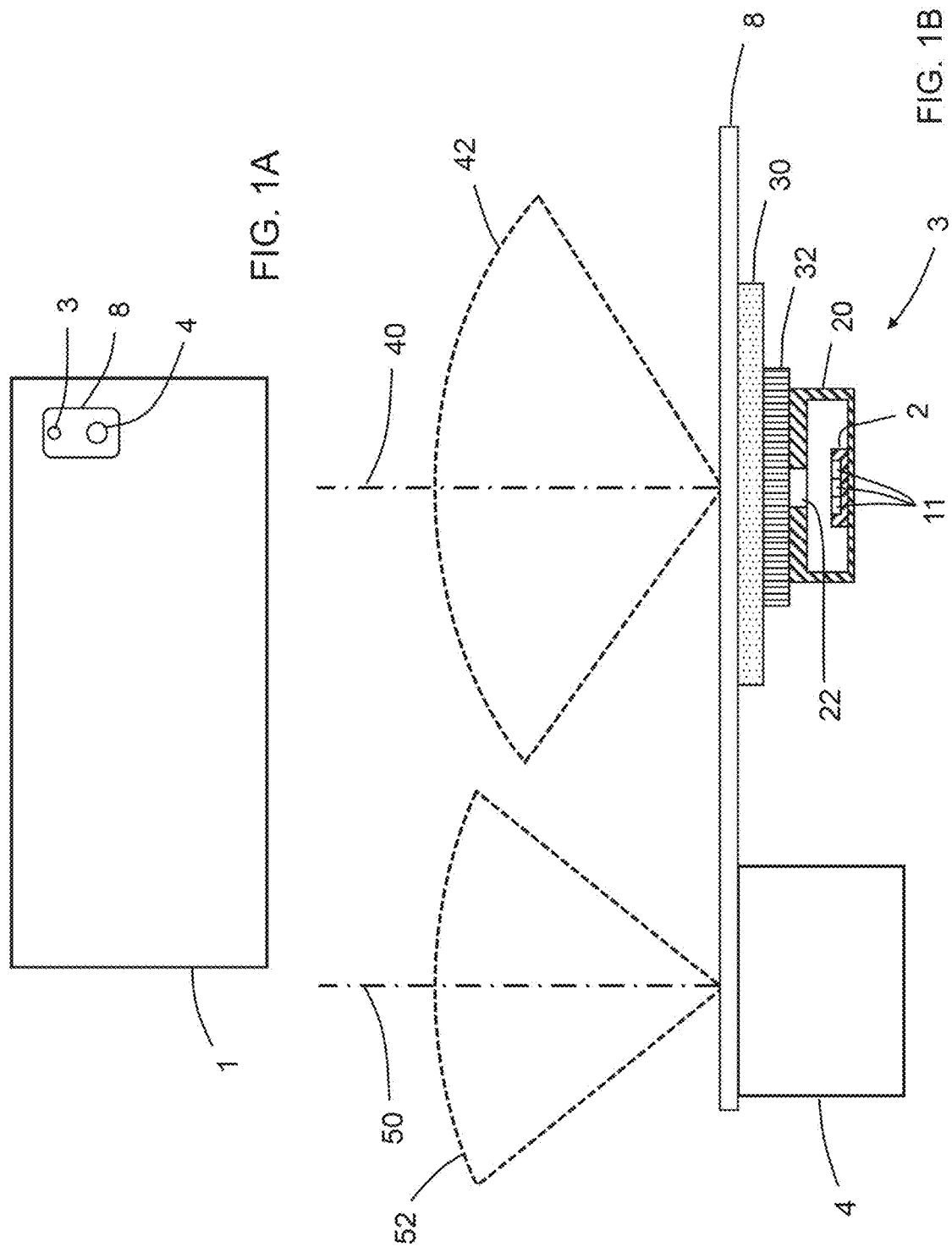

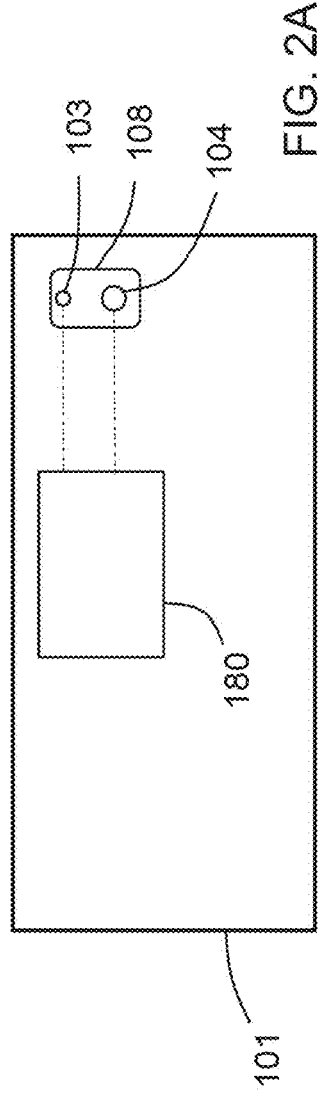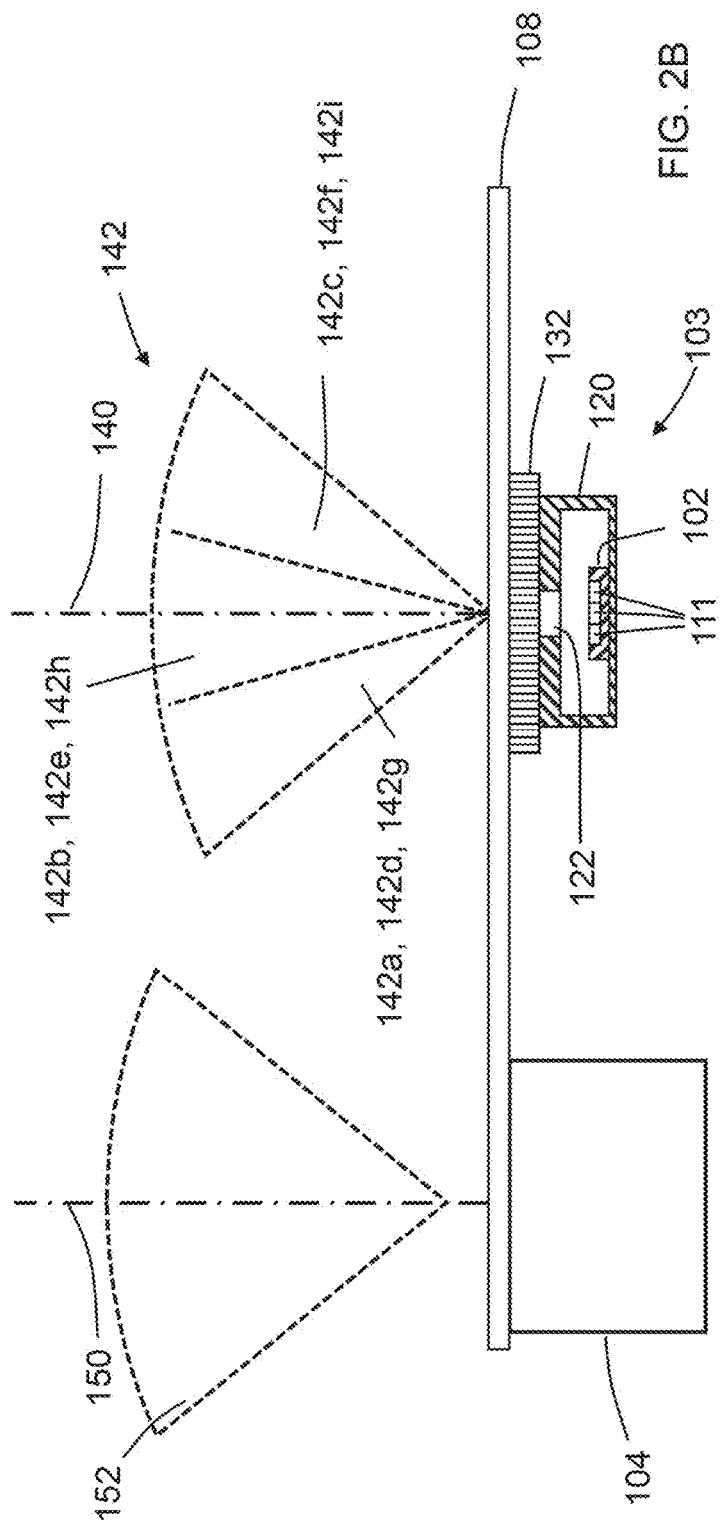

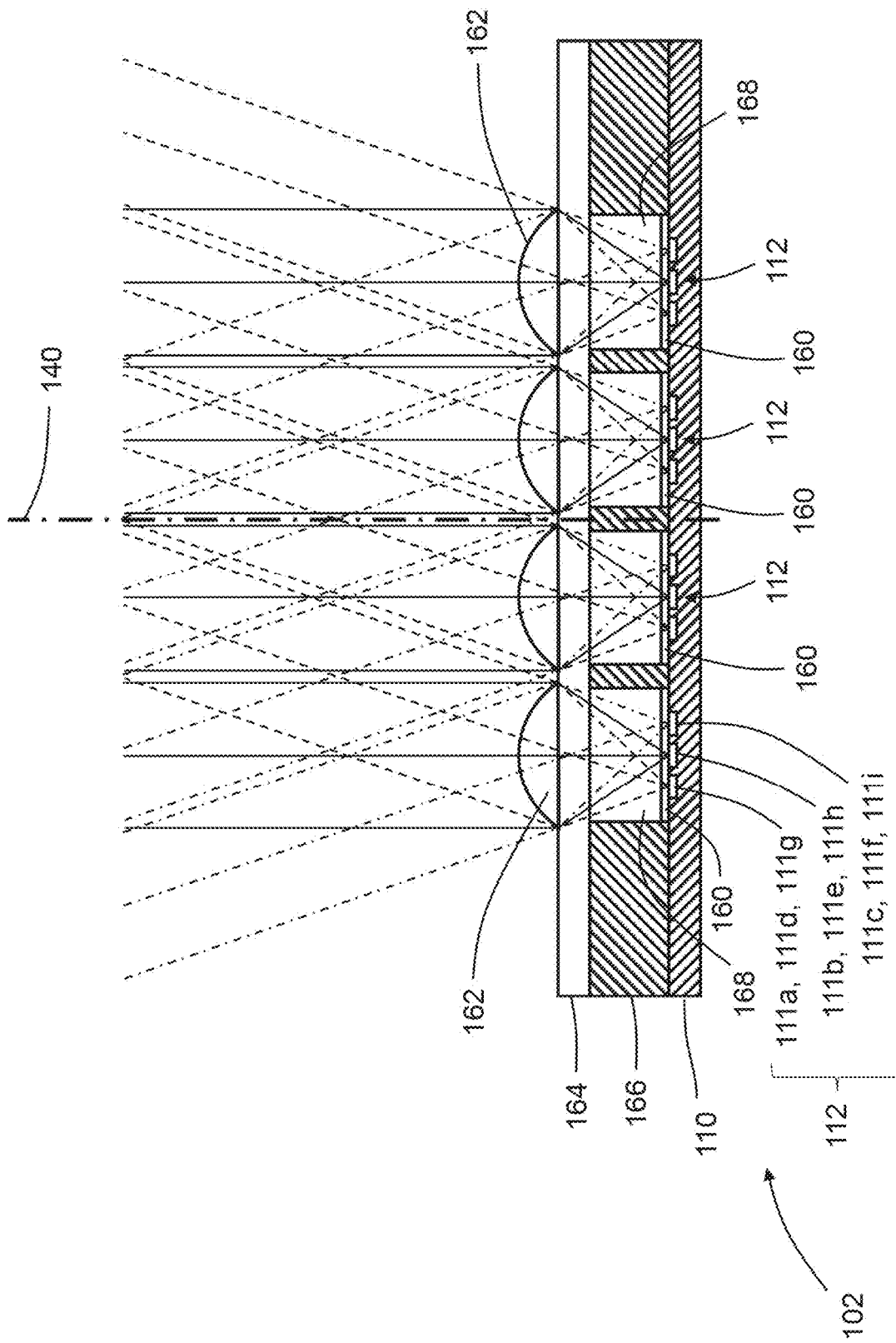

704a segmentsscene_10

| 0 | 5 | 10 | 15 | 20 |
|---|---|---|---|---|
| 1 | 6 | 11 | 16 | 21 |
| 2 | 7 | 12 | 17 | 22 |
| 3 | 8 | 13 | 18 | 23 |
| 4 | 9 | 14 | 19 | 24 |

704b segments with gapscene_10

| 0 | 5 | 10 | 15 | 20 |
|---|---|---|---|---|
| 1 | 6 | 11 | 16 | 21 |
| 2 | 7 | 12 | 17 | 22 |
| 3 | 8 | 13 | 18 | 23 |
| 4 | 9 | 14 | 19 | 24 |

FIG. 8A scene_0

FIG. 8B scene_2

FIG. 8C scene_4

FIG. 8D scene_6

FIG. 8E scene_8

FIG. 8F scene_10

SECTIONAL MULTI SPECTRAL SENSOR WITH OPTICAL BLURRING

CROSS-REFERENCE TO RELATED APPLICATIONS

This application is a 35 U.S.C. § 371 National Phase of PCT Application No. PCT/EP2022/070711, filed on Jul. 22, 2022, which claims priority to British Patent Application No. 2110931.9, filed on Jul. 29, 2021, the disclosures of which are hereby incorporated by reference herein in their entireties.

FIELD

The present disclosure relates to a multi-spectral optical sensor, a multi-spectral optical system including the multi-spectral optical sensor, an image sensing system including the multi-spectral optical system, and a method of using the multi-spectral optical sensor for use, in particular though not exclusively, for adjusting a captured image of a scene for the effects of ambient illumination on different parts of the scene.

BACKGROUND

Colour constancy is a desirable attribute of image-sensing devices, such as cameras.

Colour constancy refers to a capability of observing a feature or object as being of a relatively constant colour under different illuminations. That is, an appearance of an image captured by a camera may be affected by an ambient illumination.

By means of example, if a colour temperature of an ambient light source is relatively low, e.g. in the region of 3000 Kelvin as may be the case for an incandescent light source, an image of a white object exposed to the ambient light source will comprise a reddish hue. In contrast, for an ambient light source with a high colour temperature, e.g. in the region of 6000 Kelvin as may be the case for daylight on an overcast day, the image of the white object will comprise a slight blueish hue. That is, the object will be observed by a camera as comprising a colour that depends upon the illumination of the object by the ambient light source.

It is known to compensate for such effects by using a multi-spectral ambient light sensor (ALS) to measure spectral information relating to a scene. For example, with reference initially to FIG. 1A, there is shown a smartphone 1 including a multi-spectral ALS arrangement 3, a camera 4 and cover glass 8 which covers the multi-spectral ALS arrangement 3 and the camera 4, wherein the multi-spectral ALS arrangement 3 is configured to measure the spectral distribution of light from a scene incident on the camera 4.

FIG. 1B shows a detailed cross-sectional view of the multi-spectral ALS arrangement 3 and the camera 4. The multi-spectral ALS arrangement 3 includes a multi-spectral ALS sensor 2 having a plurality of optical detector regions 11. The multi-spectral ALS 2 is configured so that each optical detector region 11 detects a different range of wavelengths, for example because the multi-spectral ALS 2 includes a plurality of different optical filters (not shown explicitly in FIG. 1B), wherein each optical filter is configured to only transmit a corresponding different range of wavelengths onto a corresponding one of the optical detector regions 11. In the interests of clarity, only three optical detector regions 11 are shown in FIG. 1B. However, one of ordinary skill in the art will understand that the multi-spectral ALS sensor 2 may have more than three optical detector regions 11 or less than three optical detector regions 11.

The multi-spectral ALS arrangement 3 includes a housing 20 which houses the multi-spectral ALS sensor 2. The multi-spectral ALS arrangement 3 further includes a diffuser 30 and an IR cut filter 32 located between the cover glass 8 and the housing 20.

The housing 20 defines an aperture or a window 22 for admitting light into the housing 20 via the cover glass 8, the diffuser 30 and the IR cut filter 32. The multi-spectral ALS arrangement 3 has an optical axis 40 which is normal to a front surface of the multi-spectral ALS 2. Moreover, as will be understood by one of ordinary skill in the art, use of the diffuser 30 provides the multi-spectral ALS arrangement 3 with a field of view (FOV) 42 which defines a large solid angle around the optical axis 40. Each optical detector region 11 detects a different range of wavelengths incident on the optical detector region 11 from all of the different directions of incidence across the entire FOV 42 of the multi-spectral ALS arrangement 3.

The camera 4 has an optical axis 50 which is normal to a front surface of an image sensor (not shown) of the camera 4 and which is parallel to the optical axis 40 of the multi-spectral ALS arrangement 3. The camera 4 has a FOV 52 which defines a solid angle around the optical axis 50 of the camera 4, wherein the solid angle of the FOV 52 of the camera 4 is comparable to, or less than, the solid angle of the FOV 42 of the multi-spectral ALS arrangement 3.

The smartphone 1 uses white balancing, and preferably automatic white balancing (AWB), to adjust the colouration of the images captured under different illuminations. For example, the smartphone 1 may have predefined settings for typical lighting conditions such as daylight, fluorescent lighting or incandescent lighting, wherein in some instances the predefined settings may be automatically selected.

Existing techniques for white balancing include image processing by applying an algorithm based on a "Gray-World Theory" or a "White Patch Theory". The Gray World Theory is based on an assumption that the average reflectance in a captured image is achromatic. That is, the average of three colour channels: red, green and blue, should be roughly equal. The White Patch Theory is based on an assumption that a brightest pixel in a captured image corresponds to a reflection of the ambient light source, and therefore the brightest pixel may correspond to a spectrum of the ambient illumination.

Both approaches have known limitations and, notably, both approaches tend to produce substantially different results. Further, sharp changes in the scene lighting conditions can cause inaccuracies as they result in sudden sharp increases or decreases in light conditions across the scene. This problem is compounded further when the light source or sudden change is dynamic and moves around a scene. Accordingly, it is desirable to be able to correct a captured image of a scene for the effects of ambient illumination on the scene, without incurring the shortcomings of the prior art AWB methods.

Moreover, different parts of a scene may be subject to different ambient lighting conditions. For example, even different parts of a uniform coloured object in a scene may appear differently according to the corresponding ambient lighting conditions of the different parts of the uniform coloured object. Accordingly, it is desirable to be able to correct a captured image of a scene for the effects of different ambient illumination conditions on different parts of the scene, without incurring the shortcomings of the prior art AWB methods.

SUMMARY

The inventors have appreciated that the above problems, and in particular the problem of sudden, sharp lighting condition changes can be addressed by dividing the field of view of the ambient light sensor into a plurality of field of view segments, each provided with a different colour filter while blurring the image of the scene that forms at ambient light sensor so that any sharp changes are smoothed by optics automatically without the need to introduce any such blurring as part of software driven image processing. The result is that the signal detected by the ambient light sensor will always be smooth, without sharp edges and/or discontinuities and can thus be efficiently used to perform automatic white balancing.

Thus, according to a first aspect of the disclosure there is provided a multi-spectral optical sensor (102) comprising: a monolithic semiconductor chip (110) defining a plurality of subarrays (112) of optical detector regions (111), each array comprising the same number and relative spatial arrangement of optical detector regions (111); a plurality of optical filters (160); and a plurality of lens elements (162), wherein each optical filter (160) is positioned between a corresponding lens element (162) and a corresponding subarray (112) of optical detector regions (111) such that light from a scene incident on any one of the lens elements (162) along a direction of incidence propagates through the corresponding optical filter (160) towards a corresponding one of the optical detector regions (111) of the corresponding subarray (112) of optical detector regions, which corresponding one of the optical detector regions depending on the direction of incidence, and wherein the incident light forms an out-of-focus image of the scene at a plane (1105) of the optical detector regions (111).

Advantageously, the plurality of subarrays and filters positioned therewith provide provide the sensor with a sectored or segmented field of view in multiple colour channels. Unlike in the case where such a sensor might be used to capture a sharp image, it is advantageous for ambient light sensing to intentionally defocus or blur the image at the ambient light sensor so that any sharp edges or sudden changes are smoothed out by the optics.

Accordingly, in some implementations, each lens element (162) is aligned to focus the incident light onto a focal plane (1103) adjacent the plane (1105) of the optical detector regions (111) to form the out-of-focus image at the plane (1105) of the optical detector regions (111). For example, a focal plane (1103) of each lens element (162) is arranged at a predetermined distance from the plane (1105) of the optical detector regions (111) so that blur circle of each lens element (162) of a first of the optical detector regions (111) forming the out-of-focus image overlaps partially or wholly with second of the optical detector regions (111). In some implementations, the plurality of lens elements comprises a micro lens array (MLA) or a micro Fresnel lens array and, optionally, wherein the plurality of lens elements are defined by, or formed on, an optical substrate.

Advantageously, introducing a blur by positioning the optical detector regions a predetermined distance away from the focal plane of the lens elements, and/or by using MLAs and/or micro Fresnel lens arrays formed on the optical substrate, allows the optical sensor of the present disclosure to be easily manufactured as known manufacturing tools such as pick and place machines are able to accurately provide such positioning of the components. Alternatively and/or additionally, in some implementations a plurality of diffuser elements may be provided in the optical pathway to diffuse the incident light to form the out-of-focus image at a plane (1105) of the optical detector regions (111).

According to a second aspect of the present disclosure, there is provided a multi-spectral optical system (103), comprising: the multi-spectral optical sensor (102) as claimed in any preceding claim; and a processing resource (180), wherein the multi-spectral optical sensor (102) and the processing resource (180) are configured for communication with one another, wherein the processing resource (180) is configured to: associate different electrical signals generated by different optical detector regions (111) of the same subarray (112) with light incident on and forming an out-of-focus image on the multi-spectral optical (102) sensor from a scene along corresponding different directions of incidence, and associate different electrical signals generated by corresponding optical detector regions (111) of different subarrays (112) with light incident on and forming an out-of-focus image on the multi-spectral optical sensor (102) from the scene along the same direction of incidence.

Advantageously, such a system when used as an ambient light sensor allows the field of view segments of each subarray to be associated with a corresponding segment in the other subarrays.

In some implementations, the processing resource (180) is configured to associate the electrical signal generated by an optical detector region (111) with the optical transmission spectrum of the corresponding optical filter (160).

Advantageously, this allows the processing resource (180) to determine an ambient light source classification for each direction of incidence of the plurality of different directions of incidence based on a comparison between the electrical signal values corresponding to each direction of incidence and predefined spectral data. In some implementations, the predefined spectral data comprises a plurality of discrete spectra, each spectrum corresponding to a different known type or kind of ambient light source.

In some implementations, the processing resource (180) is configured to adjust the electrical signal values generated by the different optical detector regions (111) of the same subarray (112) of optical detector regions (111) to compensate for any differences in the optical transmission spectra of the corresponding optical filter arising as a result of propagation of convergent light through the corresponding optical filter along different directions of propagation for the different optical detector regions of the same subarray (112) of optical detector regions (111).

Advantageously, this allows any unwanted optical aberrations or lens effects to be compensated for.

According to a third aspect of the present disclosure, there is provided an image sensing system (101), comprising: the multi-spectral optical system (103) described above and an image sensor (104) having a known spatial relationship relative to the multi-spectral optical sensor, wherein the image sensor (104) and the processing resource (180) are configured for communication with one another, and wherein the processing resource (180) is configured to adapt an image sensed by the image sensor (104) based upon the ambient light source classification for each direction of incidence. In some implementations, the processing resource is configured to adapt the image by white-balancing the image based upon one or more parameters of the ambient light source classification for each direction. For example, the adapting may comprise gradient white-balancing the image based upon one or more parameters of the ambient light source classification for each direction of incidence.

Advantageously, an image sensing system using the multi-spectral optical system provides a system that is independent against highly dynamic structures at any position in the scene, more colour stability against manufacturing process tolerances and robust gradient automatic white balancing.

According to a fourth aspect of the present disclosure, there is provided an electronic device comprising at least one of: the multi-spectral optical sensor, the multi-spectral optical system, or the image sensing system described above. Such an electronic is accordingly provided with the same advantages as described above.

BRIEF DESCRIPTION OF THE DRAWINGS

A multi-spectral optical sensor, a multi-spectral optical system, an image sensing system and associated methods will now be described by way of non-limiting example only with reference to the drawings of which:

FIG. 1A is a schematic of a rear side of a prior art electronic device in the form of a prior art smartphone having a prior art multi-spectral ambient light sensor (ALS) arrangement and a camera;

FIG. 1B is a schematic cross-section of the prior art multi-spectral ALS and the camera of the prior art smartphone of FIG. 1A;

FIG. 2A is a schematic of a rear side of an electronic device in the form of a smartphone having a multi-spectral ALS arrangement and a camera;

FIG. 2B is a schematic cross-section of the multi-spectral ALS arrangement and the camera of the smartphone of FIG. 2A;

FIG. 3 is a schematic of a multi-spectral ALS of the multi-spectral ALS arrangement of FIG. 2A;

FIGS. 7B and 7C illustrate visualizations of an output signal of the pixels of a multi-spectral ALS where a scene is divided into twenty five regions or segments numbered 0-24 in the manner described in connection with FIG. 5 but where the image formed by the incident light is in-focus at the optical detector regions;

FIGS. 8A-8F illustrate visualizations of an output signal of a multispectral ALS (without a gap between segments) but, in this case, the light source is slowly moving across the segments from right to left such that the sharp edges may start in one or more segments in one scene, bridge two or more segments in another scene, and finally end in another one or more segments in another scene;

DETAILED DESCRIPTION

Figure 4A:
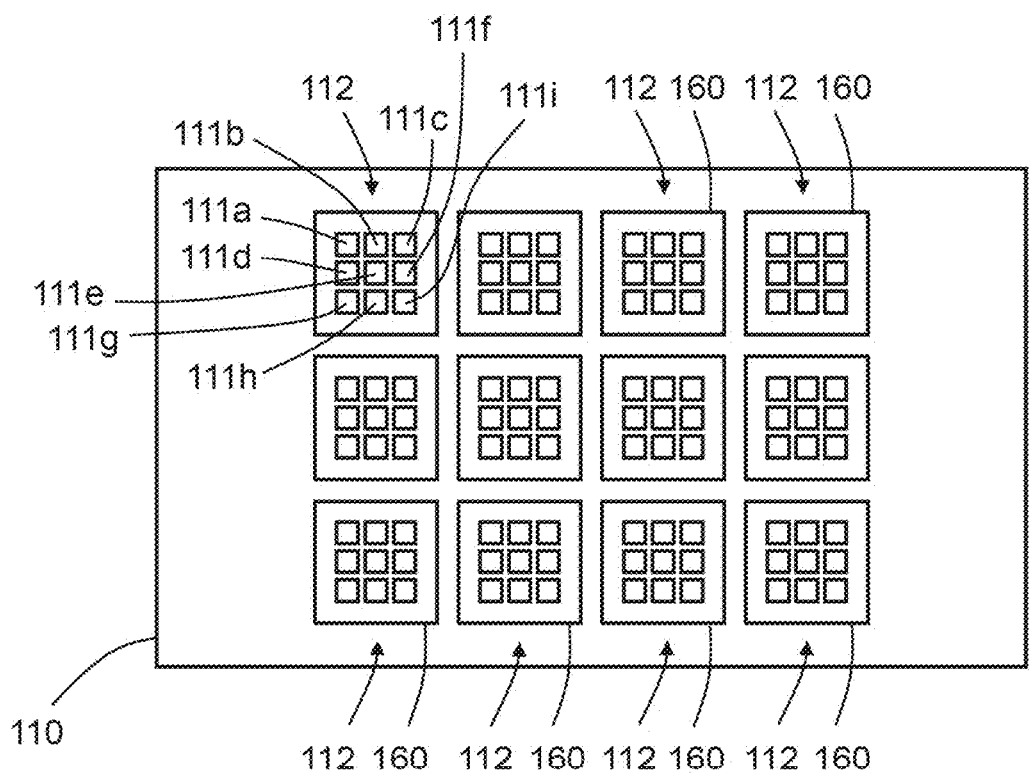
FIG. 4A is a schematic of a monolithic multi-spectral ambient light sensor (ALS) semiconductor chip of the multi-spectral ALS of FIG. 3.

Referring initially to FIG. 2A there is shown a smartphone 101 including a multi-spectral optical sensor arrangement in the form of a multi-spectral ALS arrangement 103, a camera 104 having a known spatial relationship relative to the ALS arrangement 103, and cover glass 108 which covers the multi-spectral ALS arrangement 103 and the camera 104.

FIG. 2B shows a detailed cross-sectional view of the multi-spectral ALS arrangement 103 and the camera 104. The mufti-spectral ALS arrangement 103 includes a multi-spectral ALS 102 having a plurality of optical detector regions 111. In the interests of clarity, only three optical detector regions 111 are shown in FIG. 2B. However, as will be described in more detail below, the multi-spectral ALS 102 actually defines more than three optical detector regions 111.

The multi-spectral ALS arrangement 103 includes a housing 120 which houses the multi-spectral ALS 102. The multi-spectral ALS arrangement 103 further includes an IR cut filter 132 located between the cover glass 108 and the housing 120. The housing 120 defines an aperture or a window 122 for admitting light into the housing 120 via the cover glass 108 and the IR cut filter 132. The multi-spectral ALS arrangement 103 has an optical axis 140 which is normal to a front surface of the multi-spectral ALS 102.

As will be described below, the multi-spectral ALS arrangement 103 is configured to discriminate between light incident on the multi-spectral ALS arrangement 103 from a scene along different directions of incidence and to measure the spectral distribution of the light incident on the multi-spectral ALS arrangement 103 for the different directions of incidence across a FOV 142 which defines a solid angle around the optical axis 140 of the multi-spectral ALS arrangement 103. Specifically, the multi-spectral ALS arrangement 103 is configured to discriminate between light incident on the multi-spectral ALS arrangement 103 from different sectors 142a, 142b, . . . 142i of the FOV 142 and to measure the spectral distribution of the light incident on the multi-spectral ALS arrangement 103 from each sector 142a, 142b, . . . 142i. The camera 104 also has an optical axis 150 which is normal to a front surface of an image sensor chip (not shown) of the camera 104 and which is parallel to the optical axis 140 of the multi-spectral ALS arrangement 103. The camera 104 has a FOV 152 which defines a solid angle around the optical axis 150 of the camera 104, wherein the solid angle of the FOV 152 of the camera 104 is comparable to the solid angle of the FOV 142 of the multi-spectral ALS arrangement 103.

As shown in FIG. 3, the multi-spectral ALS 102 includes a monolithic multi-spectral ALS semiconductor chip 110 shown in more detail in FIG. 4A. The monolithic multi-spectral ALS semiconductor chip 110 defines a plurality of subarrays 112 of optical detector regions in the form of twelve subarrays 112 arranged in a 3×4 array of subarrays 112, wherein the optical detector regions of each subarray 112 have the same relative spatial arrangement as the optical detector regions of each of the other subarrays 112. Specifically, each of the subarrays 112 defines a 3×3 array of optical detector regions 111a, 111b, 111c, . . . 111i.

The monolithic multi-spectral ALS semiconductor chip 110 includes plurality of optical filters 160, each optical filter 160 having a corresponding optical transmission spectrum. Each optical filter 160 is a passband optical interference filter which defines a corresponding spectral passband. Two or more of the optical filters 160 may define different spectral passbands. Moreover, each optical filter 160 is formed on, or attached to, the monolithic multi-spectral ALS semiconductor chip 110 in front of a corresponding subarray 112 of optical detector regions 111a, 111b, 111c, . . . 111i.

The multi-spectral ALS 102 further includes a plurality of lens elements 162 in the form of a micro lens array (MLA) defined by, or formed on, an optical substrate 164. The multi-spectral ALS 102 also includes a spacer 166 located between the monolithic semiconductor chip 110 and the optical substrate 164 of the MLA. The monolithic semiconductor chip 110 and the optical substrate 164 are attached to opposite sides of the spacer 166. Furthermore, the spacer 166 defines a plurality of apertures 168, wherein each aperture 168 is aligned with a corresponding lens element 162, a corresponding optical filter 160 and a corresponding subarray 112 of optical detector regions 111a, 111b, 111c, . . . 111i.

Each optical filter 160 is aligned between a corresponding lens element 162 and a corresponding subarray 112 of optical detector regions 111a, 111b, 111c, . . . 111i such that, in use, any light which is incident on any one of the lens elements 162 along any given direction of incidence converges through the corresponding optical filter 160 onto a focal plane adjacent, for example in front, over or above, the plane of a corresponding one of the optical detector regions 111a, 111b, 111c, . . . 111i of the corresponding subarray 112 of optical detector regions 111a, 111b, 111c, . . . 111i, which corresponding one of the optical detector regions 111a, 111b, 111c, . . . 111i depends on the given direction of incidence. For example, light incident on any one of the lens elements 162 along a direction of incidence which is parallel to the optical axis 140 of the multi-spectral ALS 102 as represented by the solid rays shown in FIG. 4, is focused by the lens element 162 onto a plane adjacent, for example in front, over, or above the plane of the central optical detector region 111e of the corresponding subarray 112 through the corresponding optical filter 160. Similarly, light incident on any one of the lens elements 162 along a direction of incidence which is oblique to the optical axis 140 of the multi-spectral ALS 102 as represented by the dashed rays or the dotted-dashed rays shown in FIG. 4, is focused by the lens element 162 on to the plane adjacent one of the peripheral optical detector regions 111a, 111b, 111c, 111d, 111f, 111g, 111h, 111i of the corresponding subarray 112 through the corresponding optical filter 160 which depends on the particular direction of incidence.

By focusing the incident light onto a focal point in a plane adjacent (i.e. that does not coincide with) the plane of the optical detector regions rather than onto a plane that does coincide with the plane of the optical detector regions, the image formed by the light when it does reach the detector regions is out of focus and thus blurred when it is detected. This provides a number significant advantages as will be described below in connection with FIG. 7-14. In an alternative arrangement, the lens elements may still be aligned such that its focal plane would have coincided with the optical detector regions but the blurring is achieved instead by introducing one or more optical diffuser elements into the optical pathway. It is also envisaged that a combination of the above two blurring techniques may be used. Note that in FIGS. 1-6, for ease of illustration, neither the focusing of the light onto a plane over or above the optical detector regions nor the diffuser elements are not shown. This is instead shown in more detail in FIG. 7-14.

Figure 5:
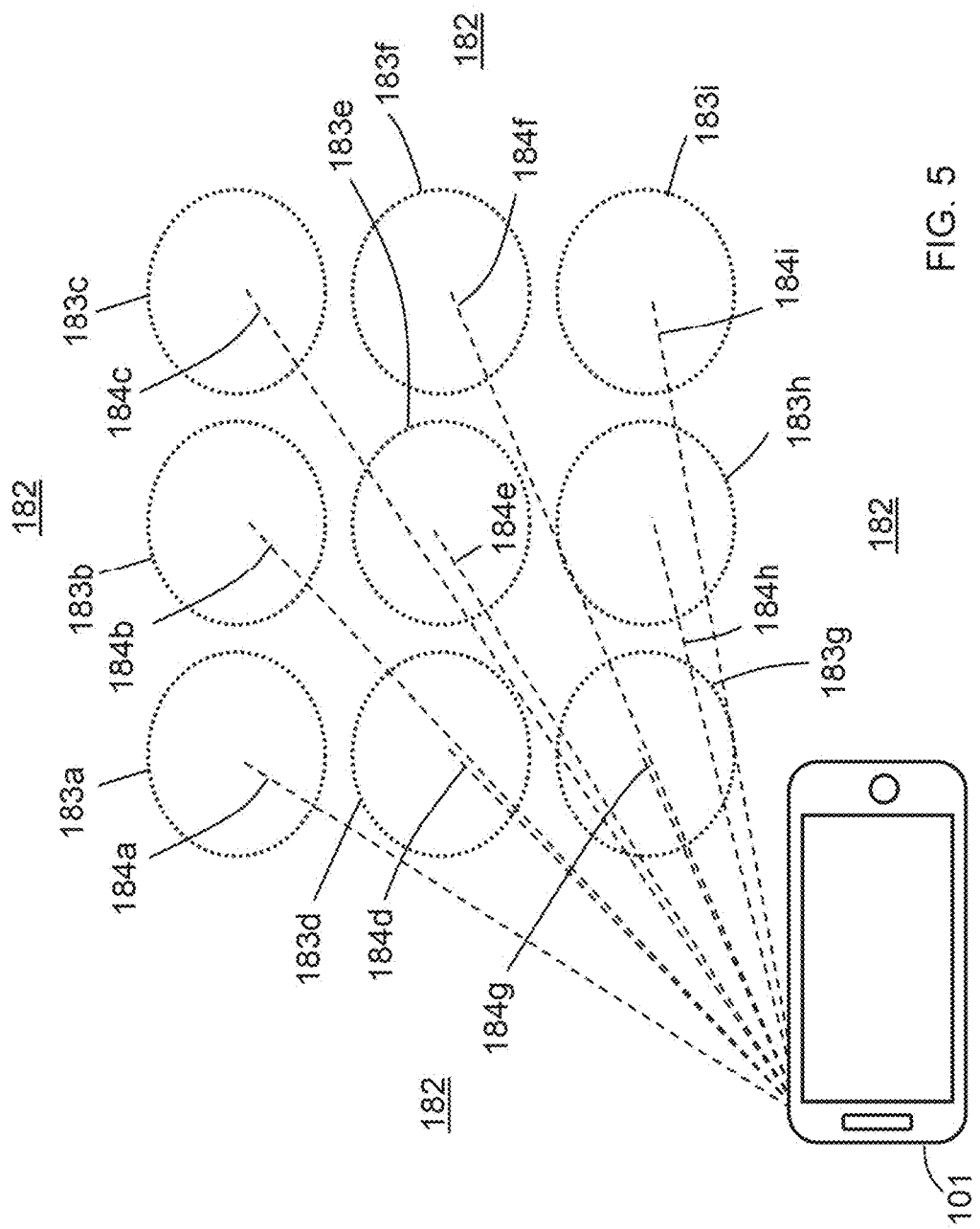
FIG. 5 illustrates the operation of an image sensing system which includes the multi-multi-spectral ALS arrangement and the camera of the smartphone of FIG. 2A.

Referring back to FIG. 2A, the smartphone 101 includes a processing resource 180 which is configured to receive data from the multi-spectral ALS 102 and the image sensor (not shown) of the camera 104. As shown in FIG. 5, the processing resource 180 is configured to associate different electrical signals generated by different optical detector regions 111a, 111b, 111c, . . . 111i of the same subarray 112 of optical detector regions with light incident on the multi-spectral ALS 102 from different regions 183a, 183b, 183c, . . . 183i of a scene generally designated 182 along corresponding different directions of incidence 184a, 184b, 184c, . . . 184i.

Conversely, the processing resource 180 is configured to associate different electrical signals generated by corresponding optical detector regions of different subarrays 112 with light incident on the multi-spectral ALS 102 from the same region of the scene 182 along the same direction of incidence. For example, the processing resource 180 is configured to associate different electrical signals generated by corresponding optical detector regions 111a of different subarrays 112 with light incident on the multi-spectral ALS 102 from region 183a of the scene 182 along the same direction of incidence 184a.

Moreover, the processing resource 180 is configured to associate the electrical signal generated by any optical detector region 111a, 111b, 111c, . . . 111i of any given subarray 112 with the optical transmission spectrum of the corresponding optical filter 160. Since each optical filter 160 has a different passband, the different electrical signal values measured by corresponding optical detector regions of different subarrays 112 of optical detector regions are representative of an optical spectrum of the light incident on the multi-spectral ALS 102 from the scene 182 along the same direction of incidence associated with the corresponding optical detector regions of the different subarrays 112 of optical detector regions. For example, the different electrical signal values measured by corresponding optical detector regions 111a of different subarrays 112 of optical detector regions are representative of an optical spectrum of the light incident on the multi-spectral ALS 102 from the scene 182 along the same direction of incidence 184*a* associated with the corresponding optical detector regions 111*a* of the different subarrays 112 of optical detector regions.

The processing resource 180 is configured to determine an ambient light source classification for each direction of incidence 184*a*, 184*b*, 184*c*, . . . 184*i* of the plurality of different directions of incidence 184*a*, 184*b*, 184*c*, . . . 184*i* based on a comparison between the electrical signal values corresponding to each direction of incidence 184*a*, 184*b*, 184*c*, . . . 184*i* and predefined spectral data. The predefined spectral data may, for example, comprise a plurality of discrete spectra, each spectrum corresponding to a different known type or known kind of ambient light source.

In addition, the processing resource 180 is configured to adapt an image sensed by the camera 104 based upon the ambient light source classification for each direction of incidence 184*a*, 184*b*, 184*c*, . . . 184*i*. Specifically, the processing resource 180 is configured to adapt the sensed image by white-balancing the image based upon one or more parameters of the ambient light source classification for each direction, for example by gradient white-balancing the image based upon one or more parameters of the ambient light source classification for each direction of incidence.

Figure 6A:
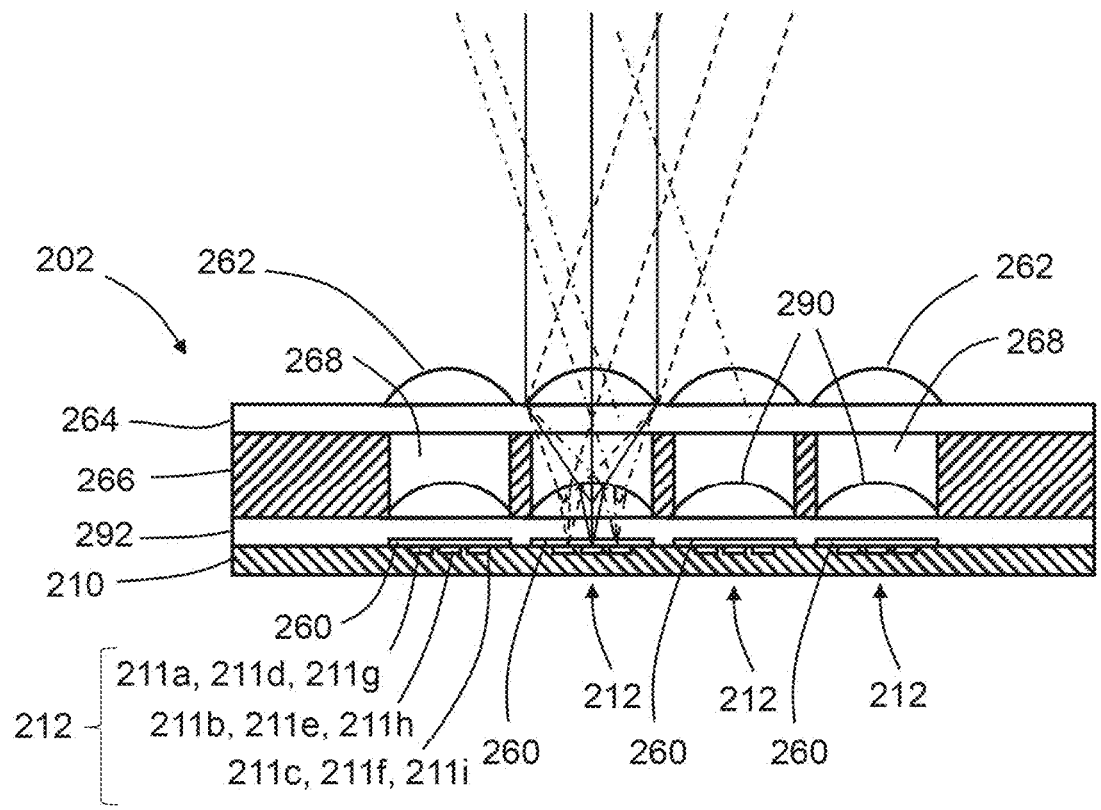
FIG. 6A is a schematic of a first alternative multi-spectral ALS.

One of ordinary skill in the art will understand that various modifications are possible to the multi-spectral ALS 102 described above. For example, FIG. 6A shows a first alternative multi-spectral ALS 202 for use with the multi-spectral ALS arrangement 103. Like the multi-spectral ALS 102 of FIG. 3, the first alternative multi-spectral ALS 202 of FIG. 6A includes a monolithic multi-spectral ALS semiconductor chip 210 which is identical to the monolithic multi-spectral ALS semiconductor chip 110 of the multi-spectral ALS 102. Like the multi-spectral ALS 102 of FIG. 3, the first alternative multi-spectral ALS 202 of FIG. 6A also includes a plurality of passband optical interference filters 260, wherein each optical filter 260 is formed on, or attached to, the monolithic multi-spectral ALS semiconductor chip 210 in front of a corresponding subarray 212 of optical detector regions 211*a*, 211*b*, 211*c*, . . . 211*i*.

The multi-spectral ALS 202 further includes a plurality of lens elements 262 in the form of a micro lens array (MLA) defined by, or formed on, an optical substrate 264. The multi-spectral ALS 202 also includes a spacer 266 located between the monolithic semiconductor chip 210 and the optical substrate 264 of the MLA. Furthermore, the spacer 266 defines a plurality of apertures 268, wherein each aperture 268 is aligned with a corresponding lens element 262, a corresponding optical filter 260 and a corresponding subarray 212 of optical detector regions 211*a*, 211*b*, 211*c*, . . . 211*i*.

However, unlike the multi-spectral ALS 102 of FIG. 3, the first alternative multi-spectral ALS 202 of FIG. 6A includes a plurality of transmissive optical elements in the form of a plurality of additional lens elements 290 provided as an additional micro lens array (MLA) on an additional optical substrate 292. The additional optical substrate 292 is attached to a front surface of the monolithic multi-spectral ALS semiconductor chip 210. A rear surface of the optical substrate 264 is attached to front side of the spacer 266 and a front surface of the additional optical substrate 292 is attached to a rear side of the spacer 266.

Each additional lens element 290 is aligned between a corresponding lens element 262 and a corresponding optical filter 260 such that light which is incident on any one of the lens elements 262 converges through a corresponding additional lens element 290 and a corresponding optical filter 260 onto a point in a plane adjacent one of the optical detector regions 211*a*, 211*b*, 211 *c*, . . . 211*i* of a corresponding subarray 212 of optical detector regions, and wherein each additional lens element 290 receives convergent light from the corresponding lens element 262 propagating along an initial direction of propagation and transforms the received convergent light into transmitted convergent light which propagates away from the additional lens element 290 along a final direction of propagation which is parallel to an optical axis of the corresponding optical filter 260 or which defines a smaller angle with respect to an optical axis of the corresponding optical filter 260 than the initial direction of propagation of the received convergent light.

The use of such an additional micro lens array (MLA) may serve to ensure that convergent light which is received by any one of the additional lens elements 290 along an initial direction of propagation which is arranged obliquely relative to an optical axis of the corresponding optical filter 260 is transformed by the additional lens elements 290 so as to propagate towards the corresponding optical filter 260 along a direction which is parallel to the optical axis of the corresponding optical filter 260 or which defines a smaller angle with respect to the optical axis of the corresponding optical filter 260 than the initial direction of propagation of the received convergent light. This may be advantageous where the optical transmission spectrum of the optical filter 260 is dependent on the angle of incidence of the light incident on the optical filter 260, for example where the optical filter 260 is an interference filter, to ensure that the light received by the optical filter 260 is subject to the known optical transmission spectrum of the optical filter 260 regardless of the initial direction of propagation along which the convergent light is received by the corresponding additional lens element 290.

In a variant of the first alternative multi-spectral ALS 202 of FIG. 6A, each additional lens element may be defined by, or formed on, a corresponding optical filter 260.

Figure 6B:
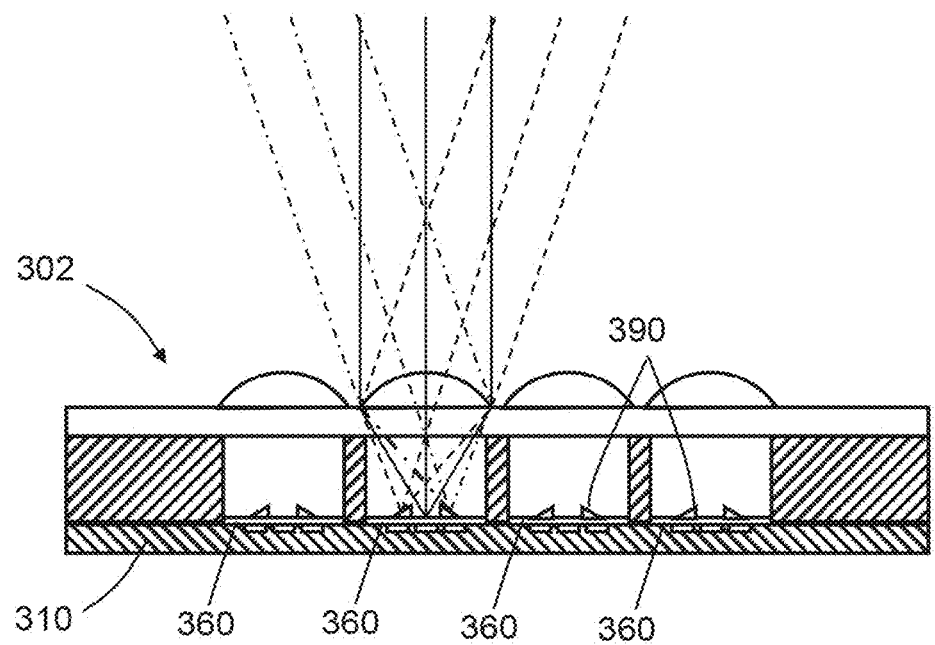
FIG. 6B is a schematic of a second alternative multi-spectral ALS.

FIG. 6B shows a second alternative multi-spectral ALS 302 for use with the multi-spectral ALS arrangement 103. The second alternative multi-spectral ALS 302 is identical to the first alternative multi-spectral ALS 202 of FIG. 6A in all respects except that rather than including a plurality of transmissive optical elements in the form of a plurality of additional lens elements 290 provided as an additional micro lens array (MLA) on an additional optical substrate 292, the second alternative multi-spectral ALS 302 of FIG. 6B includes a plurality of transmissive optical elements in the form of a plurality of Fresnel lens elements 390 provided as a micro Fresnel lens array, wherein each Fresnel lens element 390 is defined by, or formed on, a corresponding optical filter 360 of the multi-spectral ALS 302.

In a variant of the second alternative multi-spectral ALS 302 of FIG. 6B, each Fresnel lens element 390 may be defined by, or formed on, an additional optical substrate, wherein the additional optical substrate is attached to a front surface of a monolithic multi-spectral ALS semiconductor chip 310 of the multi-spectral ALS 302.

One of ordinary skill in the art will understand that in the first alternative multi-spectral ALS 202 of FIG. 6A and the second alternative multi-spectral ALS 302 of FIG. 6B, the plurality of transmissive optical elements effectively mean that convergent light propagates through each optical interference filter in a direction which is parallel to an optical axis of the optical interference filter or in a direction which is almost parallel to an optical axis of the optical interference filter to thereby ensure that the transmitted light is subject to the known optical transmission spectrum of the optical interference filter at normal incidence. As an alternative to the use of a plurality of transmissive optical elements like the transmissive optical elements 290 of the first alternative multi-spectral ALS 202 of FIG. 6A or the transmissive optical elements 390 of the second alternative multi-spectral ALS 302 of FIG. 6B, the processing resource 180 of the smartphone 101 may be configured to adjust the electrical signal values generated by the different optical detector regions 111a, 111b, 111c, . . . 111i of the same subarray 112 of optical detector regions to compensate for any differences in the optical transmission spectra of the corresponding optical filter 160 arising as a result of propagation of convergent light through the corresponding optical filter 160 along different directions of propagation for the different optical detector regions 111a, 111b, 111c, . . . 111i of the same subarray 112 of optical detector regions.

Figure 4B:
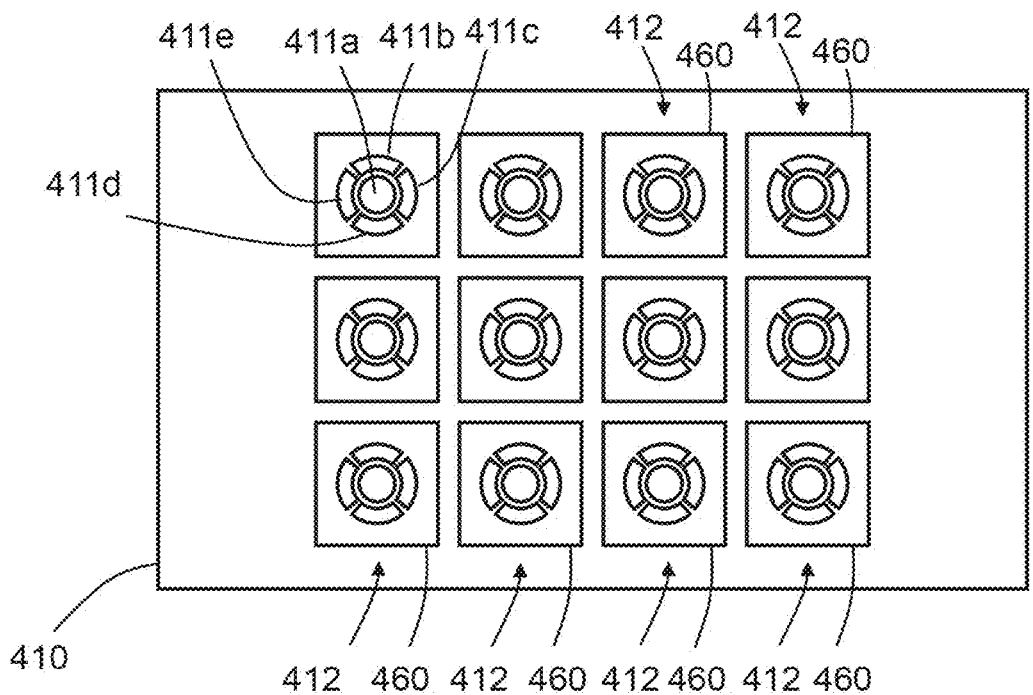
FIG. 4B is a schematic of an alternative monolithic multi-spectral ALS semiconductor chip.

FIG. 4B shows an alternative monolithic multi-spectral ALS semiconductor chip 410 for use with the multi-spectral ALS 102 of FIGS. 2B and 3, the first alternative multi-spectral ALS 202 of FIG. 6A, or the second alternative multi-spectral ALS 302 of FIG. 6B. The alternative monolithic multi-spectral ALS semiconductor chip 410 defines a plurality of subarrays 412 of optical detector regions in the form of twelve subarrays 412 arranged in a 3×4 array of subarrays 412, wherein the optical detector regions of each subarray 412 have the same relative spatial arrangement as the optical detector regions of each of the other subarrays 412. Specifically, each of the subarrays 412 defines a central optical detector region 411a surrounded by four arcuate optical detector regions 411b, 411c, 411d and 411e. The monolithic multi-spectral ALS semiconductor chip 410 includes a plurality of optical filters 460, each optical filter 460 having a corresponding optical transmission spectrum. Each optical filter 460 may a passband optical interference filter which defines a corresponding spectral passband. Two or more of the optical filters 460 may define different spectral passbands. Moreover, each optical filter 460 is formed on, or attached to, the monolithic multi-spectral ALS semiconductor chip 410 in front of a corresponding subarray 412 of optical detector regions 411a, 411b, 411c, 411d and 411e.

One of ordinary skill in the art will understand that other arrangements of the optical detector regions are possible within each subarray. For example, each subarray may define a central optical detector region surrounded by one or more concentrically arranged annular optical detector regions, wherein each annular optical detector region has a different radius. Each subarray may define a 1D or 2D array of optical detector regions of any size. The optical detector regions of each subarray may be arranged in a 2D array which is non-rectangular.

One of ordinary skill in the art will also understand that other arrangements of the subarrays are possible. For example, the subarrays may be arranged in a 1D or 2D array of any size, for example a 3×4 or 5×5 array. The subarrays may be arranged in a 2D pattern which is non-rectangular.

FIGS. 7-14 illustrate the advantages of an optical arrangement where the plurality of lens elements cause incident light to be out-of-focus or blurred when it reaches a plane of the optical detector regions. The advantages are particularly, but not exclusively, applicable when used in connection with automatic white balancing algorithms in an ALS.

Firstly, the disadvantages of the image produced by incident light being in-focus in the plane of the optical detector regions is described with reference to the optical arrangement 700 of FIG. 7A.

Figure 7A:
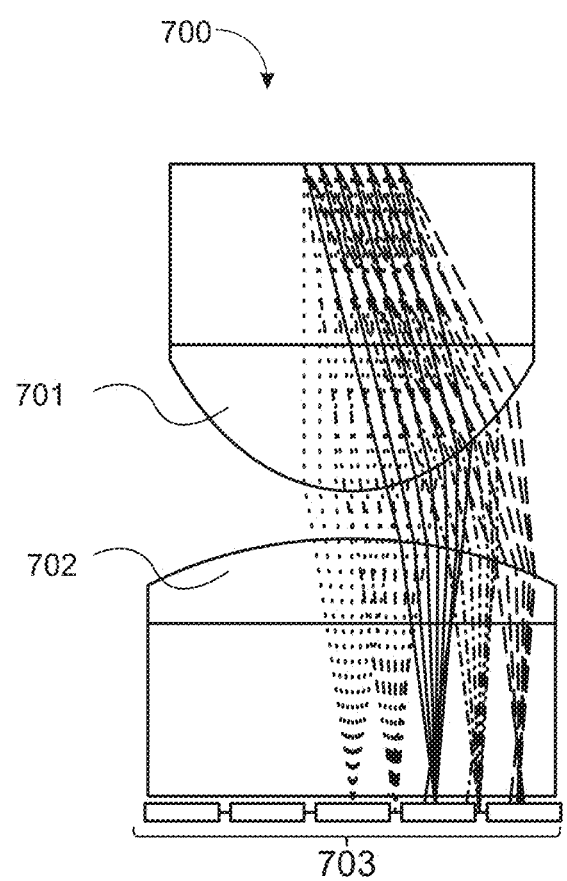
FIG. 7A is a schematic of a plurality of lens elements that operate as described in FIGS. 6A and 6B.

In FIG. 7A, a plurality of lens elements 701, 702 are shown that operate as described in FIGS. 6A and 6B. However, in FIG. 7A, the incident light is focused by the lens elements 701, 702 onto the optical detector regions 703.

FIG. 7B and FIG. 7C illustratively show visualisations 703a, 703b of an output signal of the pixels of a multi-spectral ALS where a scene is divided into twenty five regions or segments numbered 0-24 in the manner described in connection with FIG. 5 but where the image formed by the incident light is in-focus at the optical detector regions.

In the scene of FIG. 7B and FIG. 7C there is a strong, point or line-like light source 704 that cuts across a plurality of the regions. In FIG. 7B there are no gaps between the twenty four regions. In FIG. 7C there are gaps between the regions. As the image formed by the incident light is in-focus in the plane of the optical detector regions, the light source has sharp edges in the image. Further, in the case of FIG. 7C, the gaps may cause one or more blind spots where no light is detected. Light that moves in or out of such blind spots also results in sharp edges in the image. As will be explained below, the sharp edges may cause problems in automatic white balancing algorithms.

FIGS. 8A-8F similarly illustratively show visualisations of an output signal of a multi-spectral ALS (without a gap between segments) but, in this case, the light source 800 is slowly moving across the segments from right to left such that the sharp edges may start in one or more segments in one scene, bridge two or more segments in another scene, and finally end in another one or more segments in another scene. For example, the top part of the light source starts in scene 0 in field of view segment 15 in FIG. 8A and moves leftwards across field of view segment 15 during between scenes 2-6 in FIGS. 8B-8E until in scene 8 it starts to cross into segment 10 before moving fully into segment 10 in scene 10 in FIG. 8F. Similar movement happens for the portions of the light source detected in the other field of view segments.

Figure 9A:
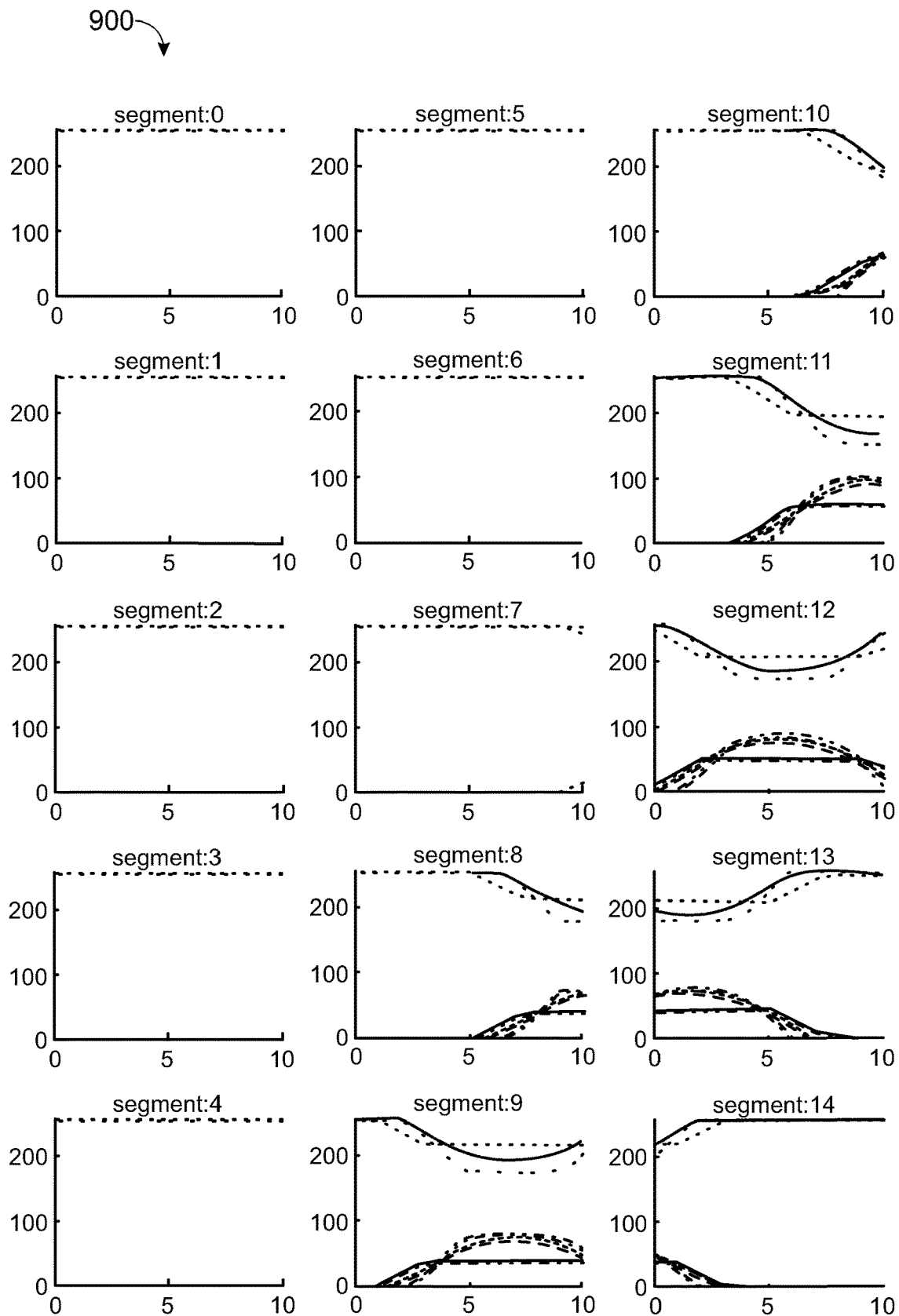
FIGS. 9A-9B illustrate twenty five plots (corresponding to each of the twenty five segments of FIGS. 8A-8F) of integrated signal strength (arbitrary units) on the y-axis against scene-number of a series of scenes as the light source moves across the sensor on the x-axis for red, green and blue (RGB) signals.
Figure 9B:
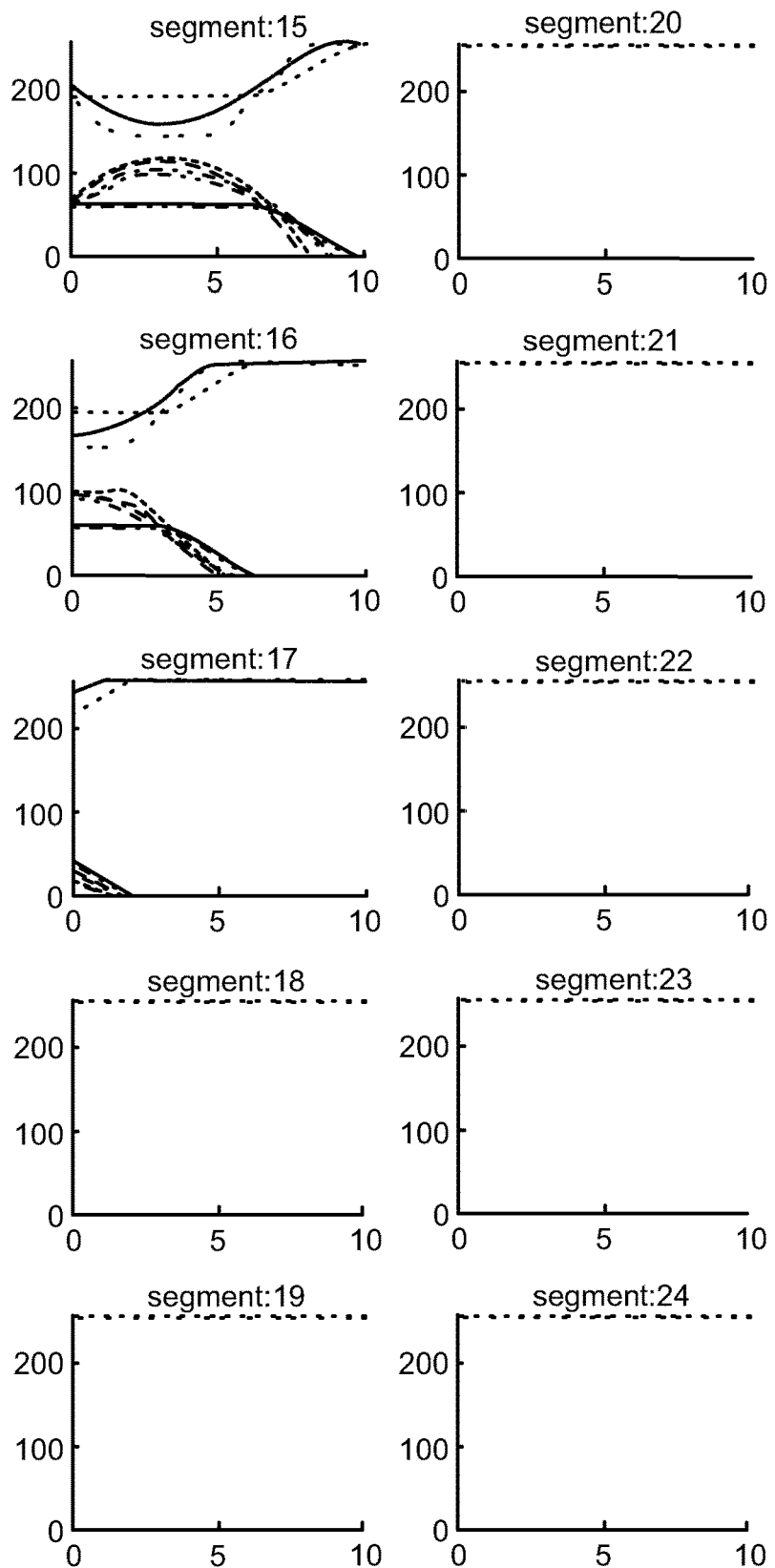

FIGS. 9A-B illustratively show twenty five plots 900 (corresponding to each of the twenty five segments of FIGS. 8A-8F) of integrated signal strength (arbitrary units) on the y-axis against scene-number of a series of scenes as the light source moves across the sensor on the x-axis for red, green and blue (RGB) signals. In practice, the number of colour signals will correspond to the number of different colour channels the above-described filters provide. In the segments which show a non-zero signal, the integrated signal shows a clipping effect as the light source moves into or exits a segment. That is, as the sharp light source begins to enter the segment, a sharp increase or decrease occurs until the light source is fully in the segment. When the light source is fully in the segment, the signal is constant and flat, described herein as a wide, constant effect. A problem of such sharp changes and wide, flat constants is that it is difficult to determine the extrema of the signal. Accurately determining such extrema is useful because an automatic white balancing gradient calculation between field of view segments may be based on the extrema values (e.g. using surface interpolation from the centroid of such extrema). If the signal is wide and flat and has clipping effects, it is difficult to accurately determine the extrema and the automatic white balancing gradient calculations are likely to be inaccurate.

Figure 10:
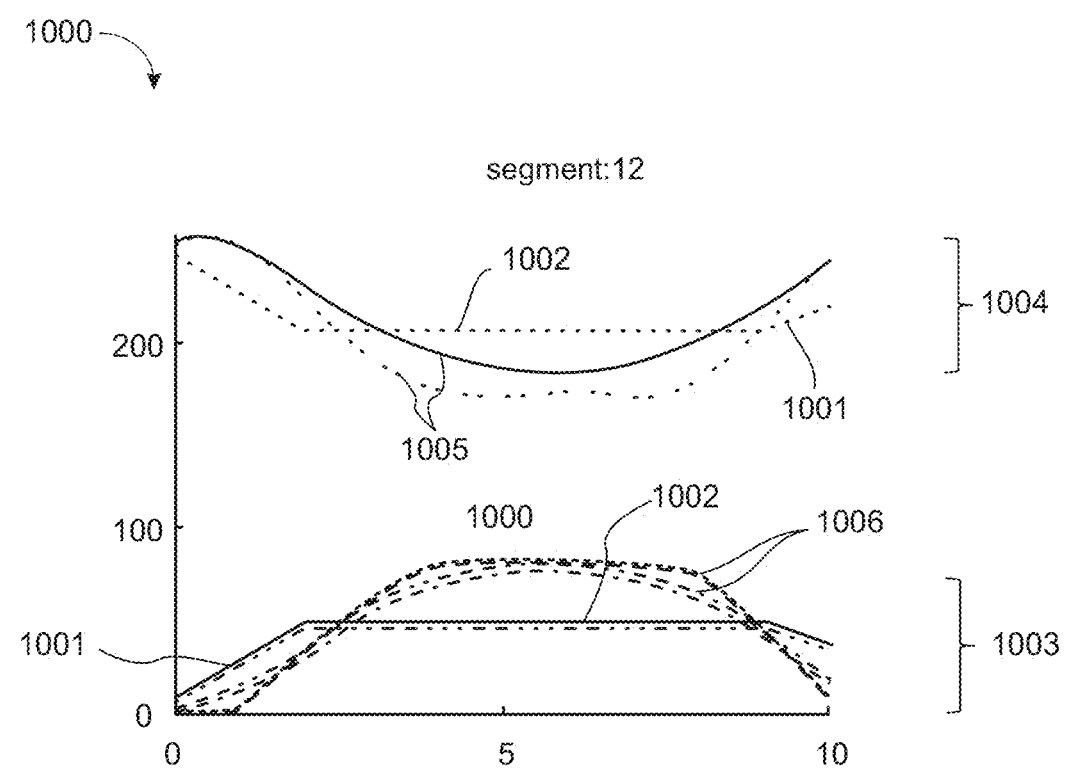
FIG. 10 is one of the plots of FIG. 9 corresponding to a central segment to demonstrate the clipping effect and wide constant effect for RGB colour channels when the light source, which is in focus, has sharp edges.

FIG. 10 shows one of the plots 1000 of FIG. 9 corresponding to a central segment such as segment 12, to demonstrate the clipping effect 1001 and wide constant effect 1002 for RGB colour channels when the light source, which is in focus, has sharp edges. In the visualisations of FIGS. 9 and 10, the RG colour channels 1003 are indicative of the light source's presence whereas the B colour channel 1004 is indicative of the background colour. This is because the examples from FIGS. 7B-10 are simplified for illustrative purposes and only show three RGB colour channels of a simulated light source (in the RG channels) and uniform, mono-colour background (B channel). In practice in real world scenes, such clear distinctions between light source and background are not as apparent and far more colour channels are envisaged as described above.

Also shown in the plots of FIGS. 9 and 10 are dotted lines 1005 (B channel), 1006 (RG channels) indicating what the signal strengths would look like if the light source were to be out-of-focus in the plane of the optical detector regions for different degrees of blurring. In particular, the effect of the blurring is to smooth out the sharp clipping effect at the edges of the field of view segments and to round off the otherwise flat wide, constant effect in the centre. The higher the blurring amount the greater the smoothing effect becomes. The smoothing or blurring amount depends on how far out of focus the incident light is at the plane of the optical detectors and this may be configured by positioning the optical detectors further from or closer to the focal plane of the lenses (and/or by introducing diffuses into the optical pathway). The more out-of-focus and thus further away from the focal plane of the lenses detector regions are, the greater the smoothing. It is envisaged that the smoothing amount may be chosen to be optimised so that the integrated pixel signals are smoothed such that only one extrema is present at any given time in each field of view segment. For example, in one implementation, the blurring is configured such that a scene is blurred across a width and/or height of two field of view segments. In other words, the blur circle, blur spot or blur disk of the cone of light as it intersects the plane of the optical detector regions after propagating beyond the focal plane of the lens overlaps two field of view segments to produce a suitable mount of blurring. It is also envisaged that it may overlaps only 1.5 field of view segments or 3 field of view segments. However, if the blurring effect is too strong, which starts to occur above 2 field of segment overlaps, the ambient light information starts to be lost.

Figure 11:
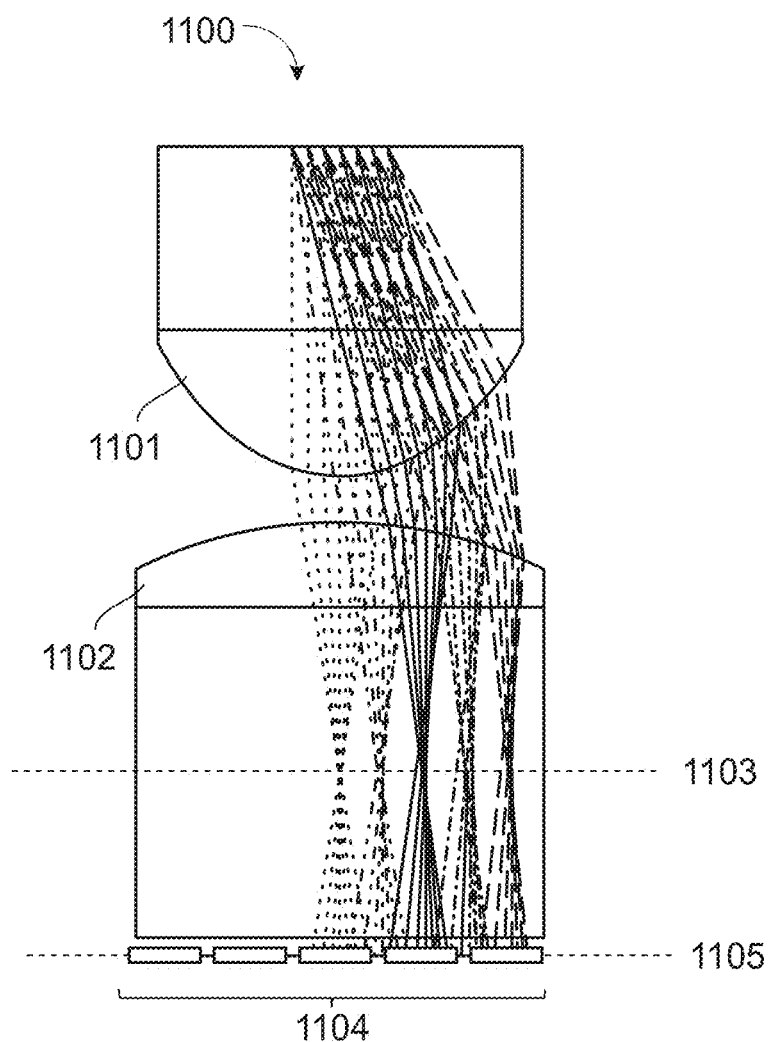
FIG. 11 illustrates an optical arrangement a plurality of lens elements are shown that operate as described in FIGS. 6A and 6B except that the incident light is focused by the lens elements onto a plane adjacent the optical detector regions such that the image formed by the incident light when it reaches the optical detector regions, it is out of focus and blurred, thereby smoothing out any clipping effects or wide, constant effects described with reference to FIGS. 9 and 10.

FIG. 11 shows an optical arrangement 1100 a plurality of lens elements 1101, 1102 are shown that operate as described in FIGS. 6A and 6B except that the incident light is focused by the lens elements 1101, 1102 onto a plane 1103 adjacent the optical detector regions 1104 such that the image formed by the incident light when it reaches the optical detector regions, it is out of focus and blurred, thereby smoothing out any clipping effects or wide, constant effects described with reference to FIGS. 9 and 10.

As described above, the visualisations of FIGS. 7-10 are illustrative visualisations only that show a simulated image with only RGB colours detected by RGB channels. In practice, a scene is likely to be more complex. In order to demonstrate the advantages of the present disclosure with respect to a real-world scene, FIGS. 12A, 12B, 13A, and 13B are now described.

Figure 12A:
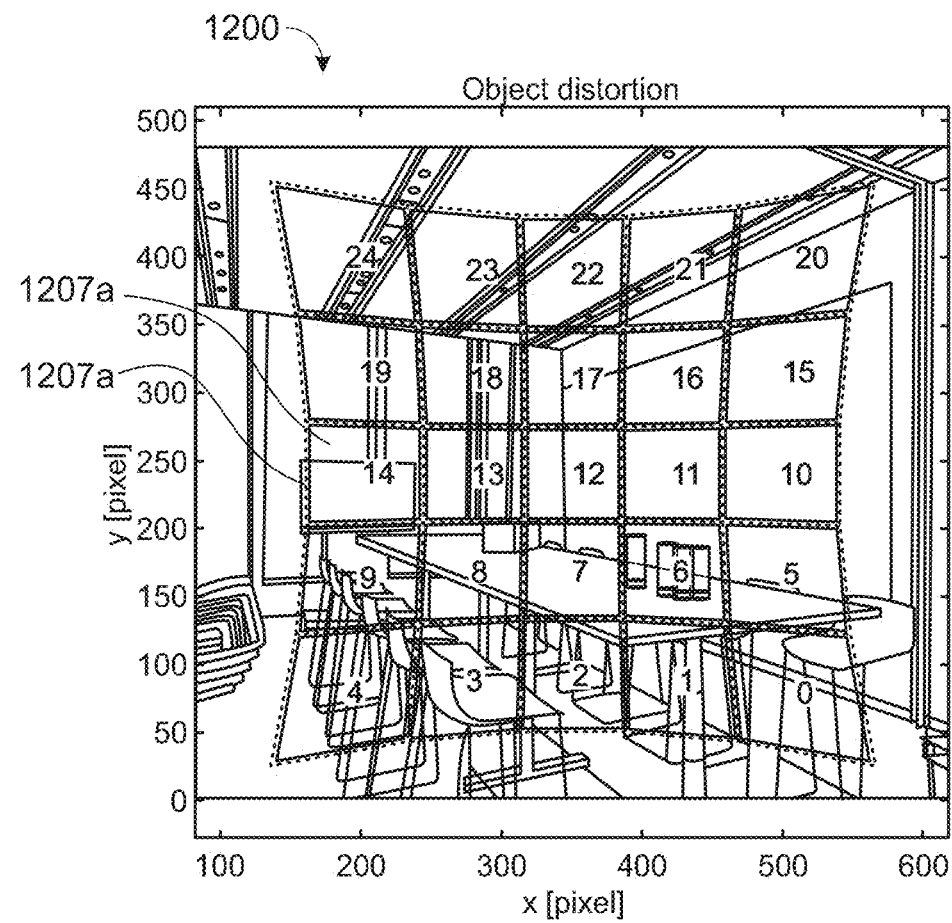
FIG. 12A is an image of a scene of a room.

In FIG. 12A, an image 1200 of a scene of a room is provided. There is a slight optical distortion in the image 1200 due to lens effects but the image is otherwise in focus as the incident light is being focused onto the plane of the optical detector regions. The scene is divided into x and y pixels and twenty five field of view segments are provided and numbered 0-25.

Figure 12B:
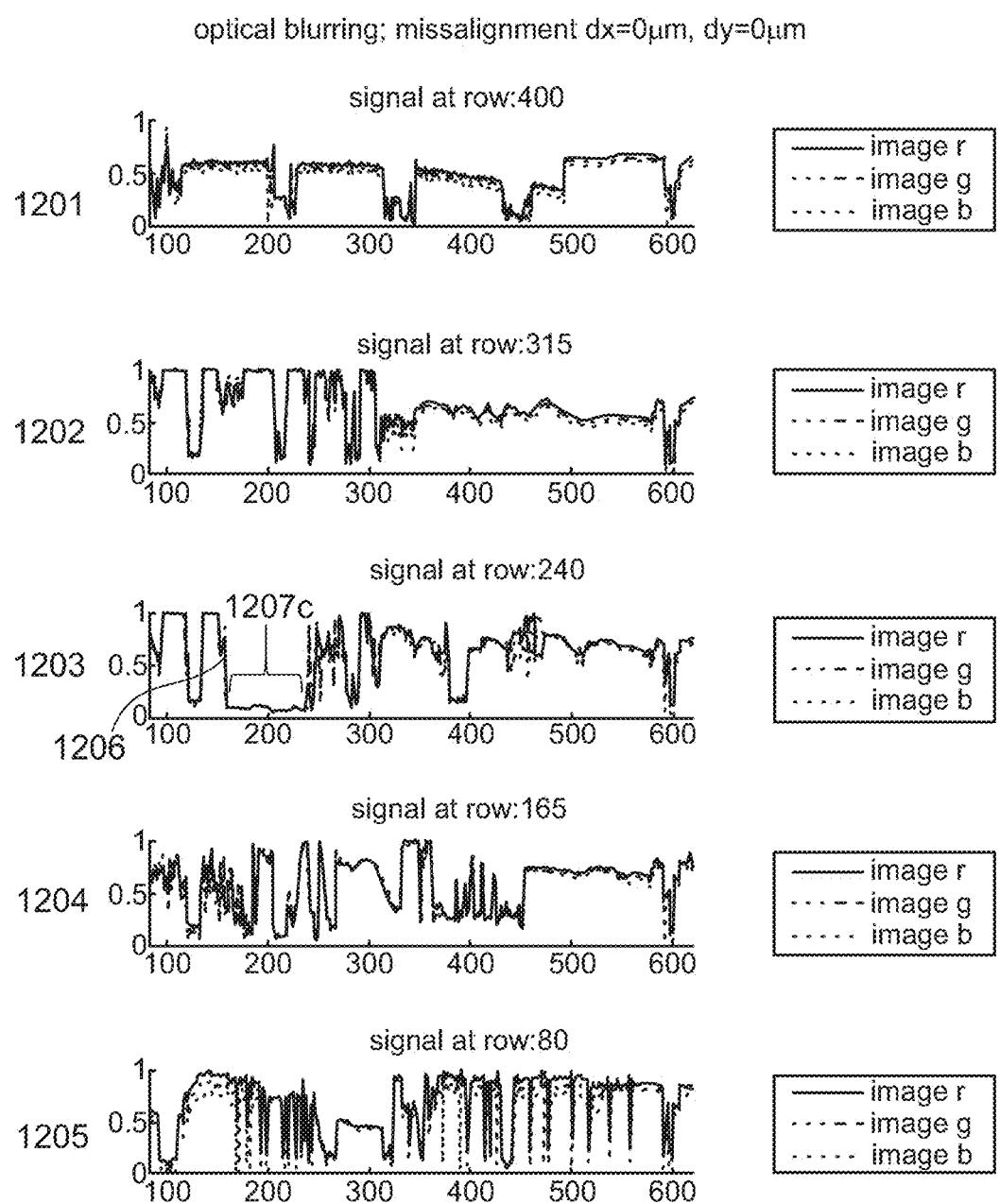
FIG. 12B shows a series of plots corresponding to the 5 RGB signal intensity of the ALS at different pixel rows 0 to 500 to demonstrate how much the signal changes depending on the lighting and colour of the pixels in each row.

FIG. 12B shows a series of plots 1201, 1202, 1203, 1204, 1205 corresponding to the RGB signal intensity of the ALS at different pixel rows 0 to 500 to demonstrate how much the signal changes depending on the lighting and colour of the pixels in each row. It is apparent that a number of sharp edges 1206 are present in all of the plots, typically corresponding to sudden lighting changes or edges in the scene. For example in segment 14 a flat screen television 1207a in the image is positioned against a window 1207b to the outside world. The black coloured flat screen television 1207a manifests itself in the image around row 240 as a large, dark series of pixels against a background window 1207b of sharp, bright pixels. In the plot corresponding to pixel row 240, this manifests itself as a region 1207c with a low signal strength having sharp edges on either side.

If the camera moves or the imaged scene moves, the edges move and may cross multiple field of view segments. This may enhance clipping and wide constant effects as described above. In such circumstances, it is difficult to calculate an accurate gradient for automatic white balancing from the plots 1201, 1202, 1203, 1204, 1205. For ease of illustration, only the RGB channels are shown in FIG. 12B, however it is envisaged that all colour channels corresponding to all the colours of the filters used are present.

Figure 13A:
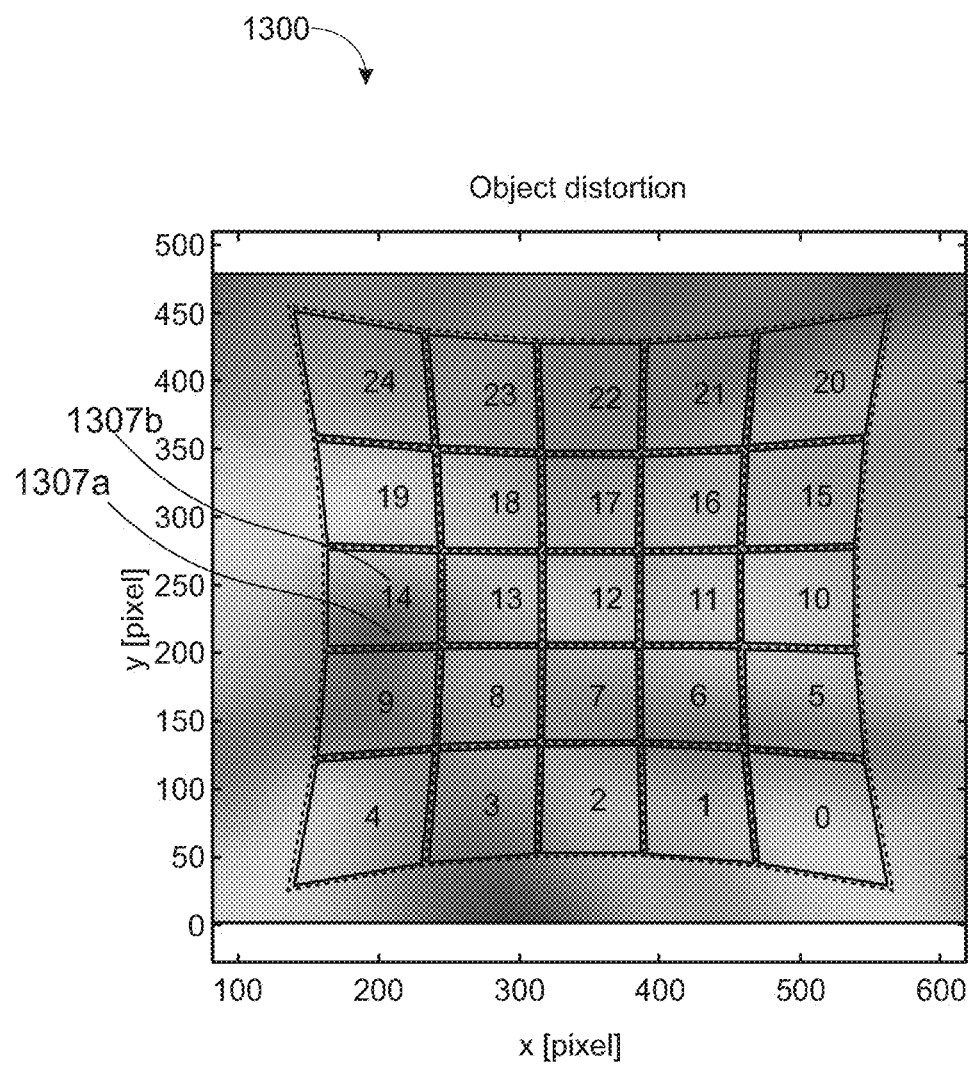
FIG. 13A illustrates the same scene as in FIG. 12A but this time the incident light is focused onto a plane adjacent the plane of the optical detector regions to blur or smooth the image.

FIG. 13A shows the same scene as in FIG. 12A but this time the incident light is focused onto a plane adjacent the plane of the optical detector regions to blur or smooth the image 1300.

Figure 13B:
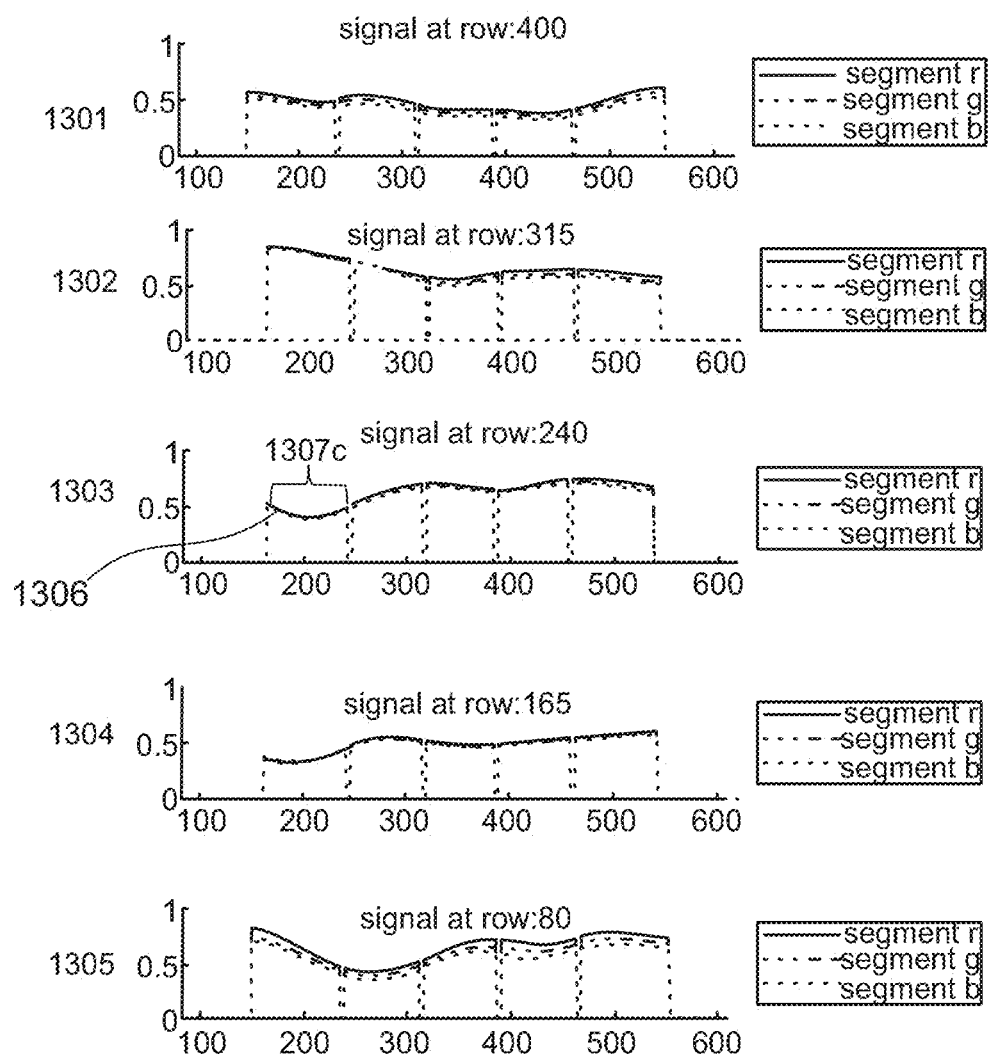
FIG. 13B illustrates plots of RGB signal intensity across the same pixel rows as in FIG. 12B.

FIG. 13B similarly show plots 1301, 1302, 1303, 1304, 1305 of RGB signal intensity across the same pixel rows as in FIG. 12B. It can immediately be seen that the sharp edges of FIG. 12B have been smoothed out. The only edges are instead simply where there are gaps between each of the field of view segments and the position and effect of these is known a priori so may be compensated for. For example, the flat screen television 1307a is now a blurry group of less dark pixels against a background window 1307b of less bright pixels. In the corresponding plot 1303 of pixel row 240, the large region with a low signal value having sharp edges corresponding to the flat screen television is instead a smoothed out region 1307c with smoother edges 1306. It is significantly easier, computationally less intensive and more efficient to calculate an accurate gradient for automatic white balancing form the plots 1301, 1302, 1303, 1304, 1305 as each segment will have generally have only one extrema and a smooth gradient across the entirety of the segment which is easier to process than a high number of sharp, discontinuous edges. Thus, by intentionally blurring the image using the optical hardware setup which focusses the incident light onto a plane adjacent the plane of the optical detector regions, the sensor according to the present disclosure provides for improved ambient light sensing. As above, only the RGB channels are shown, however it is envisaged that all colour channels are present and blurred.

Figure 14A:
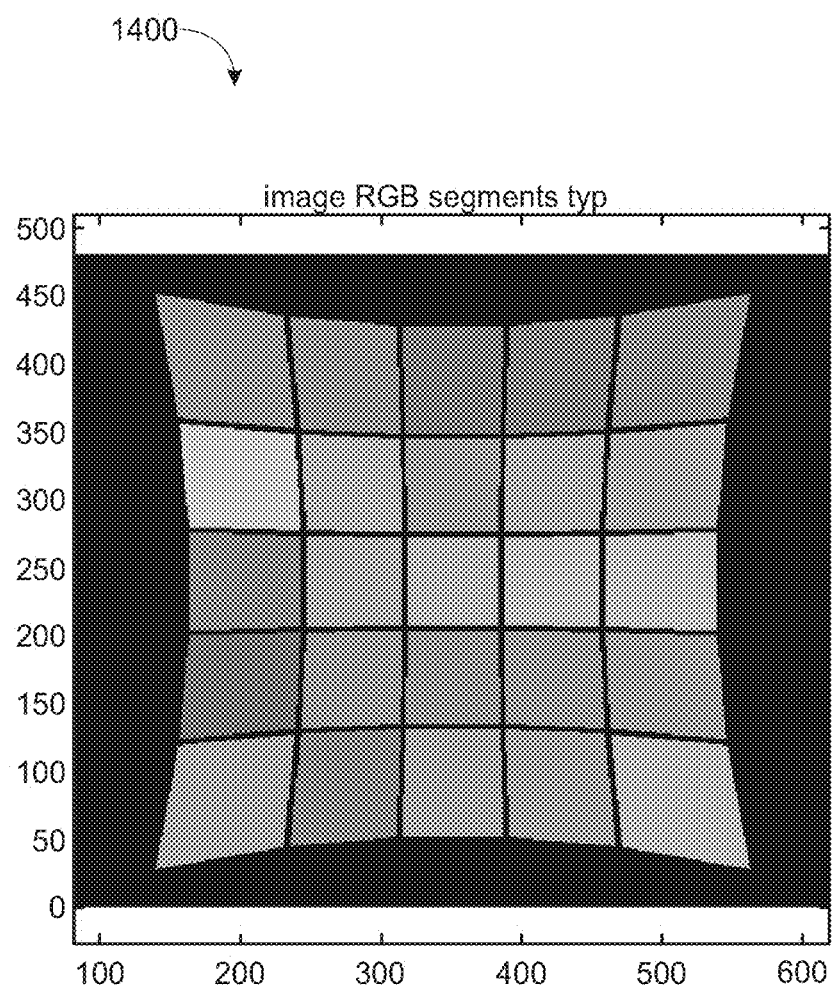
FIG. 14A illustrates the calculated output colours for each of the twenty five segments calculated from a blurred image 1400 corresponding to that of FIG. 13A.
Figure 14B:
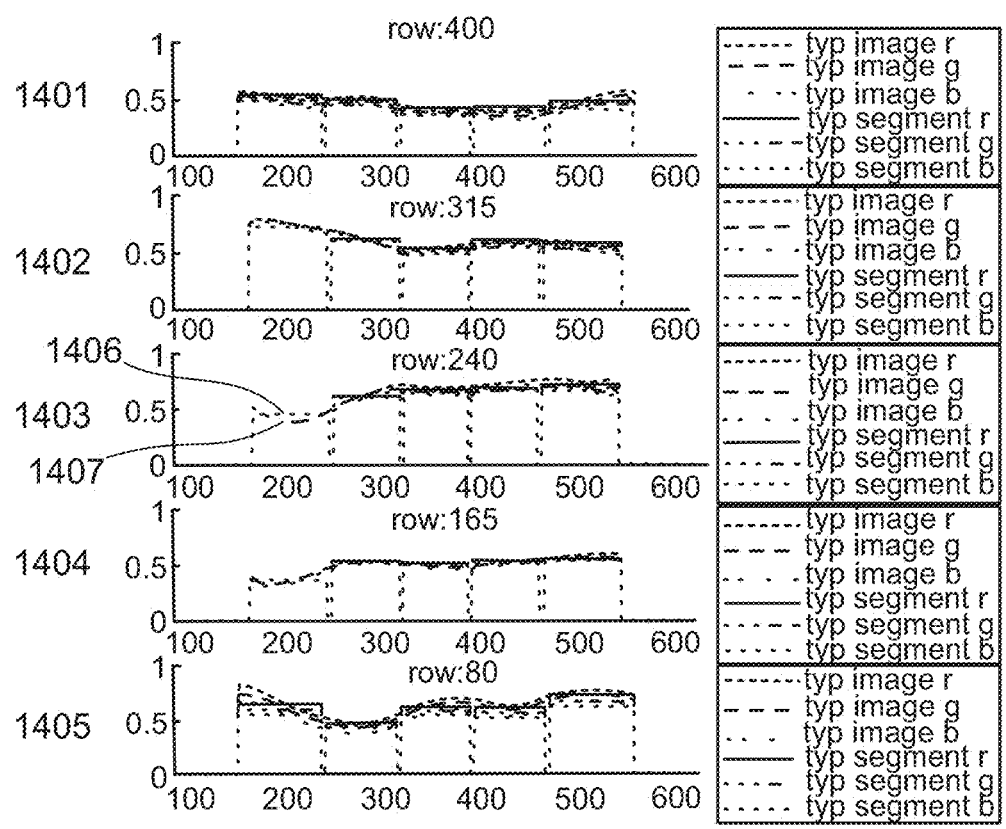
FIG. 14B. similarly shows these colour values overlaid onto the plots corresponding to that of FIG. 13B.

Finally, FIG. 14A shows the calculated output colours for each of the twenty five segments calculated from a blurred image 1400 corresponding to that of FIG. 13A. FIG. 14B similarly shows these colour values overlaid onto the plots 1401-1405 corresponding to that of FIG. 13B. The calculated single-value, constant levels such as 1406 may be used to calculate gradients between segments for subsequent automatic white balancing. The smooth signals of FIG. 13B are overlaid in FIG. 14B for the sake of illustration, for example the dotted line 1407.

It will be appreciated that the optical arrangement described above with reference to FIGS. 7-14 may be used in connection with any of the multi-spectral ALS described herein.

Although various multi-spectral ALS 102, 202, 302 have been described for use with the camera 104 of a smart phone 101, it should be understood that any of the multi-spectral ALS 102, 202, 302 may be used with a camera of an electronic device of any kind. For example, any of the multi-spectral ALS 102, 202, 302 may be used with a camera of a mobile phone, a cell phone, a tablet or a laptop. The ambient light sensing provided by the present disclosure is accordingly independent of and robustly able to handle highly dynamic scenes with moving light sources and other structures at any position in the scene. Further, the ambient light sensing is also robust against any deviations in alignment of the lenses due to manufacturing tolerances and thus provides robust automatic white balancing.

Although the disclosure has been described in terms of preferred embodiments as set forth above, it should be understood that these embodiments are illustrative only and that the claims are not limited to those embodiments. Those skilled in the art will be able to make modifications and alternatives to the described embodiments in view of the disclosure which are contemplated as falling within the scope of the appended claims.

Each feature disclosed or illustrated in the present specification may be incorporated in any embodiment, whether alone or in any appropriate combination with any other feature disclosed or illustrated herein. In particular, one of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features. The use of reference signs in the claims should not be construed as limiting the scope of the claims.

LIST OF REFERENCE NUMERALS 1 smartphone;
2 multi-spectral ALS sensor;
3 multi-spectral ALS arrangement;
4 camera;
8 cover glass;
11 optical detector region;
20 housing;
22 aperture;
30 diffuser;
32 IR cut filter;
40 optical axis of multi-spectral ALS arrangement;
42 field of view of multi-spectral ALS arrangement;
50 optical axis of camera;
52 field of view of camera;
101 smartphone;
102 multi-spectral ALS sensor;
103 multi-spectral ALS arrangement;
104 camera;
108 cover glass;
110 monolithic multi-spectral ALS semiconductor chip;
111 optical detector region;
111a-i optical detector regions;
112 subarray of optical detector regions;
120 housing;
122 housing aperture;
132 IR cut filter;
140 optical axis of multi-spectral ALS arrangement;
142 field of view of multi-spectral ALS arrangement;
142a-i sectors of field of view of multi-spectral ALS arrangement;
150 optical axis of camera;
152 field of view of camera;
160 optical filter;
162 lens element;
164 optical substrate;
166 spacer;
168 spacer aperture;
182 scene;
183a-i regions of scene;
184a-i directions of incidence;
202 multi-spectral ALS sensor;
210 monolithic multi-spectral ALS semiconductor chip;
211a-i optical detector regions;
212 subarray of optical detector regions;
260 optical filter;
262 lens element;
264 optical substrate;
266 spacer;
268 spacer aperture;
290 additional lens element;
292 additional optical substrate;
302 multi-spectral ALS sensor;
310 monolithic multi-spectral ALS semiconductor chip;
360 optical filter;
390 additional lens element;
410 monolithic multi-spectral ALS semiconductor chip;
411a-e optical detector regions;
412 subarray of optical detector regions; and
460 optical filter.
700 optical arrangement
701 plurality of lens elements
702 plurality of lens elements
703 optical detector regions
703a visualisation of output signal
703b visualisation of output signal
800 detected light source
900 plots of signal strength against scene number
1000 plot of signal strength against scene number
1001 clipping effect
1002 wide, constant effect
1003 red green colour channels
1004 blue colour channel
1005 smoothed blue colour channel
1006 smoothed red green colour channels
1100 optical arrangement 1101 plurality of lens elements
1102 plurality of lens elements
1103 focal plane
1104 plane of optical detector regions
1200 image of a scene
1201 plot of RGB signal intensity of pixel row 400
1202 plot of RGB signal intensity of pixel row 315
1203 plot of RGB signal intensity of pixel row 240
1204 plot of RGB signal intensity of pixel row 165
1205 plot of RGB signal intensity of pixel row 80
1206 sharp edges
1207a dark coloured flat screen television
1207b bright coloured background window
1207c sharp low signal value region
1300 blurred image of a scene
1301 plot of RGB signal intensity of pixel row 400
1302 plot of RGB signal intensity of pixel row 315
1303 plot of RGB signal intensity of pixel row 240
1304 plot of RGB signal intensity of pixel row 165
1305 plot of RGB signal intensity of pixel row 80
1307a dark coloured flat screen television
1307b bright coloured background window
1307 smooth low signal region
1400 calculated field of view segment colours of a scene
1401 plot of calculated RGB signal intensity of pixel row 400
1402 plot of calculated RGB signal intensity of pixel row 315
1403 plot of calculated RGB signal intensity of pixel row 240
1404 plot of calculated RGB signal intensity of pixel row 165
1405 plot of calculated RGB signal intensity of pixel row 80
1406 constant value
1407 smoothed signal

The invention claimed is:

1. A multi-spectral optical sensor, comprising:
a monolithic semiconductor chip defining a plurality of subarrays of optical detector regions, each array comprising a same number and relative spatial arrangement of optical detector regions;
a plurality of optical filters;
a plurality of lens elements; and
a spacer disposed on the monolithic semiconductor chip, wherein the spacer defines a plurality of apertures, wherein each aperture is aligned with a corresponding lens element, a corresponding optical filter, and a corresponding subarray of optical detector regions,
wherein the corresponding optical filter is positioned between the corresponding lens element and the corresponding subarray of optical detector regions such that incident light from a scene incident on any one of the lens elements along a direction of incidence propagates through the corresponding optical filter towards a corresponding one of the optical detector regions of the corresponding subarray of optical detector regions, wherein which of the corresponding one of the optical detector regions depends on the direction of incidence, and
wherein the incident light forms an out-of-focus image of the scene at a plane of the optical detector regions, and
wherein a blur circle of each lens element of a first of the optical detector regions forming the out-of-focus image overlaps a second of the optical detector regions.

2. The multi-spectral optical sensor of claim 1, wherein each lens element is aligned to focus the incident light onto a focal plane adjacent the plane of the optical detector regions to form the out-of-focus image at the plane of the optical detector regions.

3. The multi-spectral optical sensor of claim 2, wherein the focal plane of each lens element is arranged at a predetermined distance from the plane of the optical detector regions.

4. The multi-spectral optical sensor of claim 1, comprising:
a plurality of diffuser elements configured to diffuse the incident light to form the out-of-focus image at the plane of the optical detector regions.

5. The multi-spectral optical sensor of claim 1, wherein the plurality of lens elements comprises a micro lens array (MLA) or a micro Fresnel lens array.

6. The multi-spectral optical sensor of claim 5, wherein the plurality of lens elements are defined by, or formed on, an optical substrate.

7. A multi-spectral optical system, comprising:
the multi-spectral optical sensor of claim 1; and
a processing resource,
wherein the multi-spectral optical sensor and the processing resource are configured for communication with one another,
wherein the processing resource is configured to:
associate different electrical signals generated by different optical detector regions of a same subarray with light incident on and forming an out-of-focus image on the multi-spectral optical sensor from a scene along corresponding different directions of incidence, and
associate different electrical signals generated by corresponding optical detector regions of different subarrays with light incident on and forming an out-of-focus image on the multi-spectral optical sensor from the scene along a same direction of incidence.

8. The multi-spectral optical system of claim 7, wherein the processing resource is configured to associate the electrical signal generated by an optical detector region with an optical transmission spectrum of the corresponding optical filter.

9. The multi-spectral optical system of claim 7, wherein the processing resource is configured to determine an ambient light source classification for each direction of incidence of a plurality of different directions of incidence based on a comparison between electrical signal values corresponding to each direction of incidence and predefined spectral data.

10. The multi-spectral optical system of claim 9, wherein the predefined spectral data comprises a plurality of discrete spectra, each spectrum corresponding to a different known type or kind of ambient light source.

11. The multi-spectral optical system of claim 7, wherein the processing resource is configured to adjust electrical signal values generated by the different optical detector regions of the same subarray of optical detector regions to compensate for any differences in optical transmission spectra of the corresponding optical filter arising as a result of propagation of convergent light through the corresponding optical filter along different directions of propagation for the different optical detector regions of the same subarray of optical detector regions.

12. An image sensing system, comprising:
the multi-spectral optical system of claim 7; and
an image sensor having a known spatial relationship relative to the multi-spectral optical sensor,
wherein the image sensor and the processing resource are configured for communication with one another, and wherein the processing resource is configured to adapt an image sensed by the image sensor based upon an ambient light source classification for each direction of incidence.

13. The image sensing system of claim 12, wherein the processing resource is configured to adapt the image by white-balancing the image based upon one or more parameters of the ambient light source classification for each direction.

14. The image sensing system of claim 13, wherein to adapt the image further comprises gradient white-balancing the image based upon one or more parameters of the ambient light source classification for each direction of incidence.

15. An electronic device comprising the multi-spectral optical sensor of claim 1.

16. An electronic device comprising the multi-spectral optical system of claim 7.

17. An electronic device comprising the image sensing system of claim 12.

\* \* \* \* \*